United States Patent
Furuya

(10) Patent No.: US 7,012,716 B2
(45) Date of Patent: Mar. 14, 2006

(54) IMAGE RECORDING APPARATUS, IMAGE RECORDING METHOD, AND CALIBRATION SYSTEM OF IMAGE RECORDING APPARATUSES

(75) Inventor: Hiroyuki Furuya, Kanagawa (JP)

(73) Assignee: Fuji Photo Film Co., Ltd., Kanagawa (JP)

( * ) Notice: Subject to any disclaimer, the term of this patent is extended or adjusted under 35 U.S.C. 154(b) by 855 days.

(21) Appl. No.: 09/867,705

(22) Filed: May 31, 2001

(65) Prior Publication Data

US 2002/0067494 A1    Jun. 6, 2002

(30) Foreign Application Priority Data

May 31, 2000    (JP) ............................. 2000-163360

(51) Int. Cl.
*G06K 15/00* (2006.01)
*H04N 1/40* (2006.01)

(52) U.S. Cl. ...................................... 358/3.1; 358/471
(58) Field of Classification Search ................ 358/1.2, 358/1.4, 1.8, 1.9, 2.1, 3.1, 501, 530, 443, 358/465, 471, 296, 504; 399/130; 382/169
See application file for complete search history.

(56) References Cited

U.S. PATENT DOCUMENTS 5,276,459 A  *  1/1994  Danzuka et al. ........... 346/33 A

FOREIGN PATENT DOCUMENTS

| JP | 2000-33732 |   | 2/2000 |
| JP | 2000175042 | * | 6/2000 |
| JP | 2001251510 | * | 9/2001 |

* cited by examiner

*Primary Examiner*—Jerome Grant, II
(74) *Attorney, Agent, or Firm*—Sughrue Mion, PLLC

(57) ABSTRACT

An image recording apparatus has a converting device which converts a first image signal into a second image signal by employing an image signal converting condition, a recording device for recording an image by signal values of the second image signal, a measuring device for reading a test chart image recorded by the recording device by test chart output image signal values to acquire measurement density values, a selecting device for selecting reference density values corresponding to the measurement density values from target density data which indicates a relationship between the first image signal and target density of an image recorded on a recording medium, and a calculating device for calculating target image signal values based upon the target density data and the reference density values and for calculating the image signal converting condition based upon both the target image signal values and the test chart output image signal values.

18 Claims, 11 Drawing Sheets

TARGET DENSITY DATA

EXPOSURE LIGHT AMOUNT SIGNAL CONVERTING CONDITION T

IMAGE RECORDING APPARATUS, IMAGE RECORDING METHOD, AND CALIBRATION SYSTEM OF IMAGE RECORDING APPARATUSES

BACKGROUND OF THE INVENTION

1. Field of the Invention

The present invention generally relates to a technical field capable of adjusting image density. More specifically, the present invention relates to an image recording method, an image recording apparatus, and a calibration system of image recording apparatuses, in which after the image recording apparatus is calibrated by employing a test chart of calibration purposes, an image recording operation of a desirable image is carried out.

2. Description of the Related Art

In various sorts of image recording apparatus (printers) such as laser printers, thermal printers, copying apparatus, and ink jet printers, calibration operations of these apparatuses are carried out in order that while aging-effect changes, characteristic differences in recording media such as photosensitive materials with respect to each of manufacturing lots and the like are absorbed, images can be properly recorded in response to input image signals supplied to these apparatus.

In general, a calibration operation of this apparatus is carried out as follows. That is, while a calibration test chart image having a plurality of patch images (hereinafter simply referred to as patches) is employed, a converting condition applied to an input image signal or an exposure light amount signal is calculated in order that desirable image density may be represented from an input image signal representative of the test chart image.

First, an image recording apparatus outputs a test chart for calibration purposes on which patches made of three primary colors such as C(cyan), M(magenta), and Y(yellow) have been recorded in a predetermined format. Next, density of each of these primary color patches of this test chart is measured. Furthermore, in order that a proper image recording operation adapted to the input image signal or the exposure light amount signal may be carried out based upon both the measurement density values and target density data, a calculation is made on an image signal converting condition or an exposure light amount signal converting condition, which converts the input image signal or the exposure light amount signal into an output image signal so as to adjust the image signal converting condition or the exposure light amount signal converting condition.

On the other hand, an example of such a calibration method is described in Japanese Patent Application Laid-open No. 2000-33732. In this publication, in accordance with the image recording method for exposing/recording the image on the photosensitive material, the test chart image for the calibration purpose which is provided with a plurality of three-primary-color patches such as C, M, Y patches whose densities are different from each other is formed by applying a predetermined amount of exposure light to the photosensitive material. In other words, when the input image signal values of the test chart image are converted into the output image signal values, the input image signal values are converted to the exposure light amount signal values of the test chart image corresponding to the intermediate signal and the exposure light amount signal values are converted to the output image signal values by employing the exposure light amount signal converting condition representative of such a relationship between the exposure light amount signal and the output image signal. The respective patches of the test chart image are produced by employing the acquired output image signal values (test chart output image signal values). After the test chart image has been formed, the density measurement is carried out to acquire the measurement density values corresponding to the respective patches. Alternatively, the respective patches of the test chart image are produced by employing the previously-fixed output image signal values of the test chart image (test chart output image signal values), and then, the density measurements of the respective patches are carried out to acquire the measurement density values corresponding to the respective patches. In this test chart image, when a desirable measurement density values cannot be acquired, this exposure light amount signal converting condition must be adjusted.

The exposure light amount signal converting condition is adjusted as follows. That is, while a sample of plural sets of both the exposure light amount signal values corresponding to the sample data of the target gradation data and the image density values is fixed (as standard), a plurality of regions of the image density value are defined under such a condition that image density values located adjacent to each other while these plural fixed image density values are arranged in the order of the image density value are set as both an upper limit value and a lower limit value of each of the regions. Target exposure light amount signal values of the test chart corresponding to each of the image density values (target density values) by which these plural regions are defined are calculated by employing such a relationship between the measurement density values of the test chart image and the exposure light amount signal values of the test chart image. Then, the exposure light amount signal converting condition is calculated by employing the target exposure light amount signal values and the test chart output image signal values.

As a consequence, in order to improve the adjustment precision of the exposure light amount signal converting condition with employment of the test chart image, the target exposure light amount signal values must be calculated with high precision. These target exposure light amount signal values are required to be calculated with high precision by the following manner. That is, while a large number of the patches having the different densities from each other, which are owned by the test chart image, are prepared, the density measurement is carried out. Then, each of the image density values (target density values) of the target gradation data is interposed between a pair of density measurement values of the test chart image, and is internally interpolated so as to obtain the target exposure light amount signal value of the test chart. As a result, a total number of the data related to the measurement density values, which are measured by employing the test chart image, becomes necessarily larger than a total number of the data related to the above-explained image density values of the target gradation data (target density values). Therefore, there is a problem that the density measurement takes a lot of time. Also, since the total patch number is increased, the patch arrangement of the test chart image must be arranged in a two-dimensional manner. Thus, there is another problem in that the complex apparatus arrangement of the density measuring apparatus is needed by which the densities of the patches arranged in the two-dimensional manner are measured. Also, the amount of the photosensitive materials to be used for recording thereon the test chart image is necessarily increased. As a result, there is another problem in that the consumption of these photosensitive materials cannot be reduced, as well as the running cost cannot be lowered.

SUMMARY OF THE INVENTION

The present invention has been made to solve the above-described problems, and an object of the present invention is therefore to provide an image recording apparatus, an image recording method, and furthermore, a calibration system of image recording apparatuses, in which an image signal converting condition such as an exposure light amount signal converting condition is calculated by employing a calibration method capable of calibrating the image recording apparatus with high precision even if the number of patches of an test chart image is small, and then, a desirable image is recorded with employment of this calculated image signal converting condition.

This invention provides an image recording apparatus which has a recording device for recording an image on a recording medium, an image signal converting device for converting signal values of a first image signal of the image into signal values of the second image signal to be used for recording by the recording device by employing an image signal converting condition indicative of a relationship between the first image signal and the second image signal, a density measuring device for reading a test chart image recorded by the recording device by using test chart output image signal values of the second image signal, to acquire measurement density values of the test chart image, a reference density value selecting device for selecting reference density values corresponding to the measurement density values from a target density data, the target density data indicating a relationship between the first image signal and target density of an image recorded on the recording medium, and having a total data number larger than that of the measurement density values acquired by the density measuring device, and a converting condition calculating device for calculating target image signal values of the test chart image based upon the target density data and the reference density values, each of the target image signal values corresponding to each of the measurement density values, and for calculating the image signal converting condition based upon both the target image signal values and the test chart output image signal values, wherein signal values of the first image signal of an image to be recorded are converted into signal values of the second image signal by the image signal converting condition and the image is recorded.

It is preferable that the reference density value selecting device selects a pair of reference density values corresponding to each of the measurement density values, the pair putting each of the measurement density values therebetween, and the converting condition calculating device calculates each of the target image signal values based upon a linear interpolation manner by employing the pair of the reference density values.

It is also preferable that the target density data is set in accordance with a sort of the recording medium.

It is also preferable that the image recording apparatus has converting condition storage device for storing thereinto the image signal converting condition with respect to each of sorts of recording media.

Preferably, in the image recording apparatus after the image signal converting condition is set in the image signal converting device, the test chart image is recorded by the recording device based upon predetermined test chart input image signal values which are converted to the test chart output image signal values at a least by the image signal converting condition set in the image signal converting device, and respective operations of the image signal converting device, the recording device, the density measuring device, the reference density value selecting device, and the converting condition calculating device are repeatedly carried out by employing the test chart input image signal values, while the image signal converting condition set in the image signal converting device is replaced by the calculated image signal converting condition every time the converting condition calculating device calculates, until the image signal converting condition which makes a relationship between signal values of the first image signal of the test chart image and the measurement density values of the test chart image substantially coincident with the target density data is found out, whereby a relationship between the first image signal and density of an image to be recorded on the recording medium is substantially made coincident with the target density data.

Alternatively, in the image recording apparatus, the test chart output image signal values may be predetermined values, and the image signal converting condition which is calculated by the converting condition calculating device by employing the test chart output image signal values may be set to the image signal converting device, preferably.

It is also preferable that the image recording apparatus has judging device for judging as to whether or not the measurement density values of the test chart image satisfy an error condition and default setting device for default-setting the image signal converting condition in accordance with a judgement result of the judging device.

It is also preferable that the image recording apparatus has notifying device for issuing a notification in accordance with the judgement result.

It is also preferable that the test chart image corresponds to such a test chart image in which a plurality of patch images are arranged along one array direction, and densities of the patch images vary in an order of a patch image arrangement, and the image recording apparatus has measurement density control device operable in such a manner that when measurement density value of the test chart image does not correspond to the order of the patch image arrangement along the array direction, the measurement density value not corresponding thereto is removed from the measurement density values of the test chart image.

The recording medium is preferably a photosensitive material.

The invention also provides an image recording method in which signal values of a first image signal are converted into signal values of a second image signal by employing an image signal converting condition indicative of a relationship between the first image signal and the second image signal, and an image is recorded on the recording medium by using signal values of the second image signal, having the following steps: a step of reading a test chart image recorded on the recording medium by using test chart output image signal values of the second image signal to acquire measurement density values of the test chart image, a step of selecting reference density values corresponding to the measurement density values from a target density data, the target density data indicating a relationship between the first image signal and target density of an image recorded on the recording medium, and having a total data number larger than that of the measurement density values, a step of calculating target image signal values of the test chart image based upon the target density data and the reference density values, each of the target image signal values corresponding to each of the measurement density values, and a step of calculating the image signal converting condition based upon both the target image signal values and the test chart output image signal values.

More, this invention provides a calibration system of image recording apparatuses comprising a plurality of image recording apparatuses, and a density measuring apparatus connected via a communication line to the plural image recording apparatuses.

In this system, each of the image recording apparatuses has an image signal converting device for converting signal values of a first image signal into signal values of a second image signal to be used for recording on a recording medium by employing an image signal converting condition indicative of a relationship between the first image signal and the second image signal, a recording device for recording an image on a recording medium by using signal values of the second image signal into which signal values of the first image signal are converted by the image signal converting device, a communication device for receiving density measurement values of a test chart image which is recorded by the recording device from test chart output image signal values of the second image signal and supplied to the density measuring apparatus and measured by the density measuring apparatus, a reference density value selecting device for selecting reference density values corresponding to the measurement density values from a target density data, the target density data indicating a relationship between the first image signal and target density of an image recorded on the recording medium, and having a total data number larger than that of the measurement density values acquired by the density measuring device, an a converting condition calculating device for calculating target image signal values of the test chart image based upon the target density data and the reference density values, each of the target image signal values corresponding to each of the measurement density values, and for calculating the image signal converting condition based upon both the target image signal values and the test chart output image signal values, and the density measuring apparatus has a density measuring device for measuring densities of the test chart image supplied from each of image recording apparatuses to acquire measurement density values, and communication device for transmitting the measurement density values acquired by the density measuring device to the image recording apparatus in which the test chart image is recorded.

BRIEF DESCRIPTION OF THE DRAWINGS

Better understanding of the present invention may be made by reading a detailed description with reference to the accompanying drawings, in which.

DETAILED DESCRIPTION OF THE PREFERRED EMBODIMENTS

Referring now to the accompanying drawings, both an image recording apparatus and an image recording method according to the present invention will be described in detail based upon preferred embodiments shown in these drawings.

Figure 1:
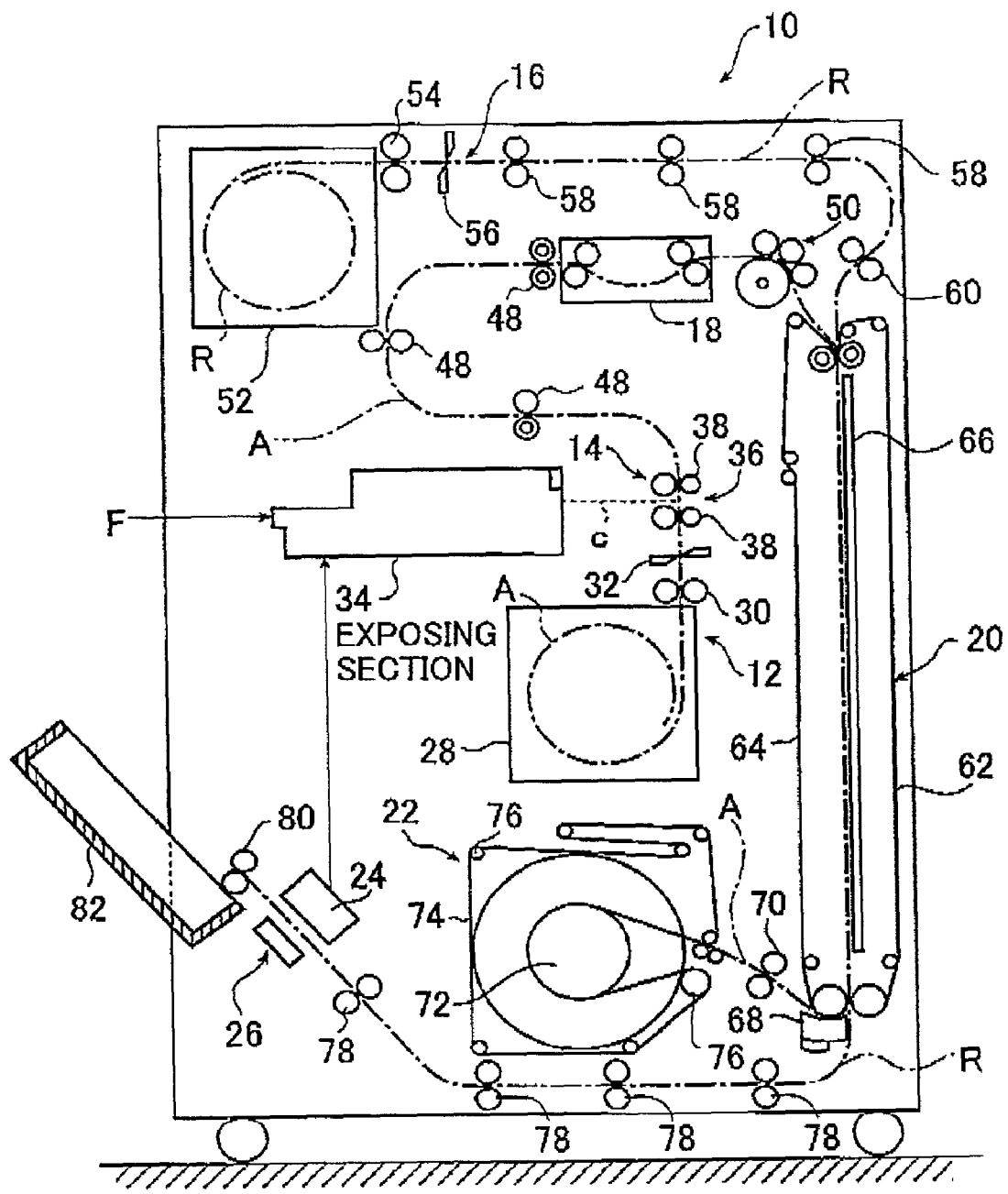
FIG. 1 is a conceptional diagram for indicating an example of an image recording apparatus according to the present invention, while executing an image recording method of the present invention.

FIG. 1 conceptionally indicates an example of an image recording apparatus according to the present invention, by which an image recording method of the present invention is carried out.

This image recording apparatus (digital color printer) 10 corresponds to such an apparatus with employment of a photosensitive and heat developed recording material, which contains a heat development step as a recording material, transfers an image to an image receiving material having an image receiving layer under presence of an image forming solvent such as water, and then forms the transferred image thereon. It should be noted that the image recording apparatus of the present invention is not limited only to the image recording apparatus using this recording material, and may also be other image recording apparatus with employment of various sorts of photosensitive materials, for instance, silver halide photosensitive materials such as negative films, reversal films, and printing paper. Alternatively, the present invention may be applied to image recording apparatus using electronic photographic photosensitive bodies or electronic photographic photosensitive materials. Further, the present invention may be applied to ink jet type printers.

The image recording apparatus 10 (hereinafter referred to as a recording apparatus 10) shown in the figure is constituted by employing a recording material supplying section 12, an exposing section 14, an image receiving material supplying section 16, a water application section 18, a heat developing/transferring section 20, a disposal material storing section 22, and a density measuring section 24. The recording material supplying section 12 supplies the above-explained photosensitive and heat developed recording material A (hereinafter referred to as a recording material A) which is a kind of photosensitive materials. The image receiving material supplying section 16 supplies an image receiving material R.

In the shown example, the recording material A is wound in a roll form under long size condition (while photosensitive surface of the recording material is set to inner side of the roll shape), and the wound recording material A is stored into a magazine 28 having a light shielding property, and then, the recording material stored in the magazine 28 is mounted on the recording apparatus 10.

Both a pair of extracting rollers 30 and a cutter 32 are arranged in the vicinity of a recording material take-out port of the magazine 28. The recording material A is extracted by the extracting roller pair 30, the length of which is determined based upon a length of a print to be formed, and then, is cut by the cutter 32. Thereafter, the cut recording material is transported to the exposing section 14 located in a down stream (down stream along material transport direction) so as to be exposed therein.

The exposing section 14 is arranged by both an exposing unit 34 and a sub-scanning transporting unit 36.

The exposing unit 34 contains such a beam scanning optical system known in this technical field. This beam scanning optical system owns three sorts of optical beam light sources (R-light source, G-light source, and B-light source) corresponding to the respective color photosensitive layers (red (R) color, green (G) color, and blue (B) color) of the recording material A; an optical deflecting device; an f6 lens, and the like. The beam scanning optical system deflects an optical beam C along a main scanning direction, which is modulated in response to an output image signal, and then enters the deflected optical beam c into a predetermined recording position. On the other hand, the sub-scanning transporting unit 36 is similarly known in this technical field. In this example, the sub-scanning transporting unit 36 is constituted by one pair of nip rollers 38 and 38. These nip rollers 38/38 are arranged so as to nip the above-described recording position along the transport direction, and transport the recording material A along a sub-scanning direction which is perpendicular to the main scanning direction.

While being supplied from the recording material supplying section 12 and transferred by way of the nip roller pair 38 of the sub-scanning transporting unit 36 along the sub-scanning direction, the recording material A is scanned/ exposed in the two-dimensional manner by using the optical beam c which is modulated in response to the output image signal and is deflected along the main scanning direction so as to record a latent image thereon, and then, the resultant recording material A is transported to the down stream.

Figure 2A:
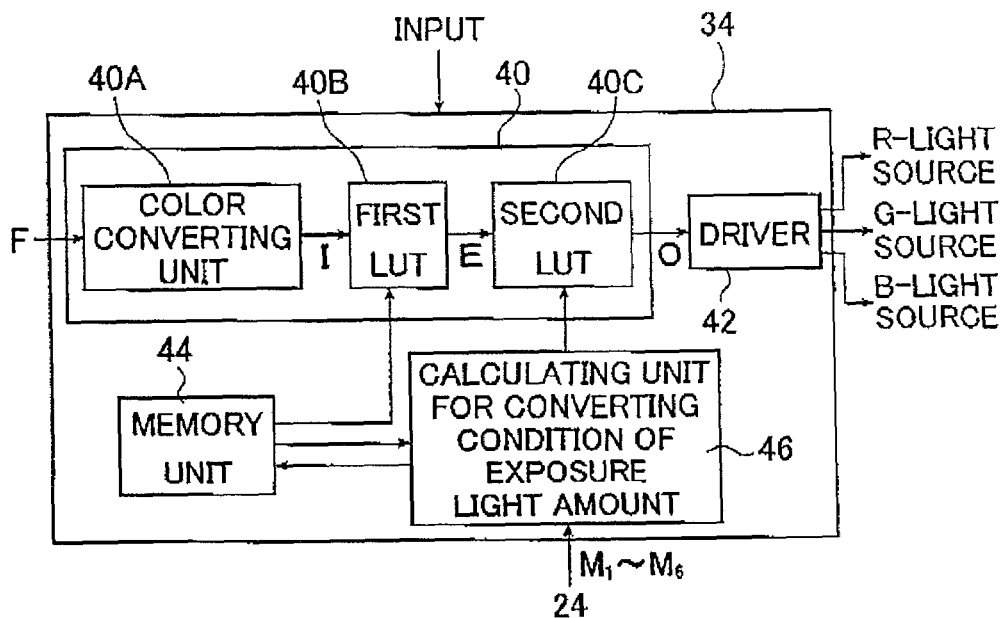
FIG. 2A is a schematic block diagram for indicating an example of an exposing unit shown in FIG. 1.

FIG. 2A is a schematic block diagram for representing an exposure control system of each of optical beam light sources of the exposing unit 34.

The exposing unit 34 is provided with a signal converting unit 40, a memory unit 44, and a calculating unit for an exposure light amount signal converting condition (hereinafter refereed to as calculating unit) 46.

In this illustrated example, an input image signal which is supplied from a supply source F of an image signal of an imaging devices such as a scanner (image reading apparatus) or a digital camera, an image processing devices or the like, is converted into an output image signal in the signal converting unit 40. Thereafter, the output image signal is supplied to a driver 42. The driver 42 modulates each optical beam of the above-explained optical beam light sources in response to this output image signal to drive these optical beam light sources.

In this case, the signal converting unit 40 is provided with a color converting unit 40A, a first LUT (lookup table) 40B, and a second LUT 40C.

The color converting unit 40A is equipped with a three-dimensional LUT or a color conversion matrix, by which a color conversion adapted to the recording apparatus 10 is carried out to produce an input image signal I. The first LUT 40B is provided with as a one-dimensional LUT, a table of characteristic data E-I which converts the input image signal I made of R, G, B into an exposure light amount signal (namely, first image signal of the present invention to be claimed). The second LUT 40C is equipped with as a one-dimensional LUT, a table of an exposure light amount signal converting condition T (image signal converting condition of the present invention to be claimed), by which this exposure light amount signal E is converted into an output image signal O (second image signal of the present invention to be claimed) adapted to the driver 42.

It should also be noted that the second LUT 40C corresponds to such an image signal converting device of the present invention to be claimed in such a case that the exposure light amount signal E is used as the first image signal of the present invention, and the output image signal O is used as the second image signal of the present invention.

Also, both the driver 42 and the sub-scanning transporting unit 36 correspond to a recording device of the present invention to be claimed.

The memory unit 44 is employed to record/save therein characteristic data E-I, target density data E-D, the exposure light amount signal converting condition T to be set by the second LUT 40C, an exposure light amount signal converting condition $T^{(0)}$ used for default setting, and further test chart input image signal values used to produce a test chart image such that image densities Ds of an image recorded on this predetermined recording material A become desirable density values. The characteristic data E-I is indicated in accordance with a sort of a predetermined recording material A. The target density data E-D is such that a relationship between the exposure light amount signal E and the image density D is represented in accordance with the sort of recording material A. The memory unit 44 constitutes a converting condition storage device of the present invention to be claimed. In response to an instruction issued from a control panel (not shown) of the recording apparatus 10 as to the sort of recording material A and the default setting operation of the exposure amount light signal converting condition T and/or in response to the ID information of the set magazine 28, the characteristic data E-I, the target density data E-D, and the exposure light amount signal converting condition T, alternatively the exposure light amount signal converting condition $T^{(0)}$ of the default setting operation (if necessary) are called from the memory unit 44 to be supplied to the first LUT 40B and the calculating unit 46.

Figure 2B:
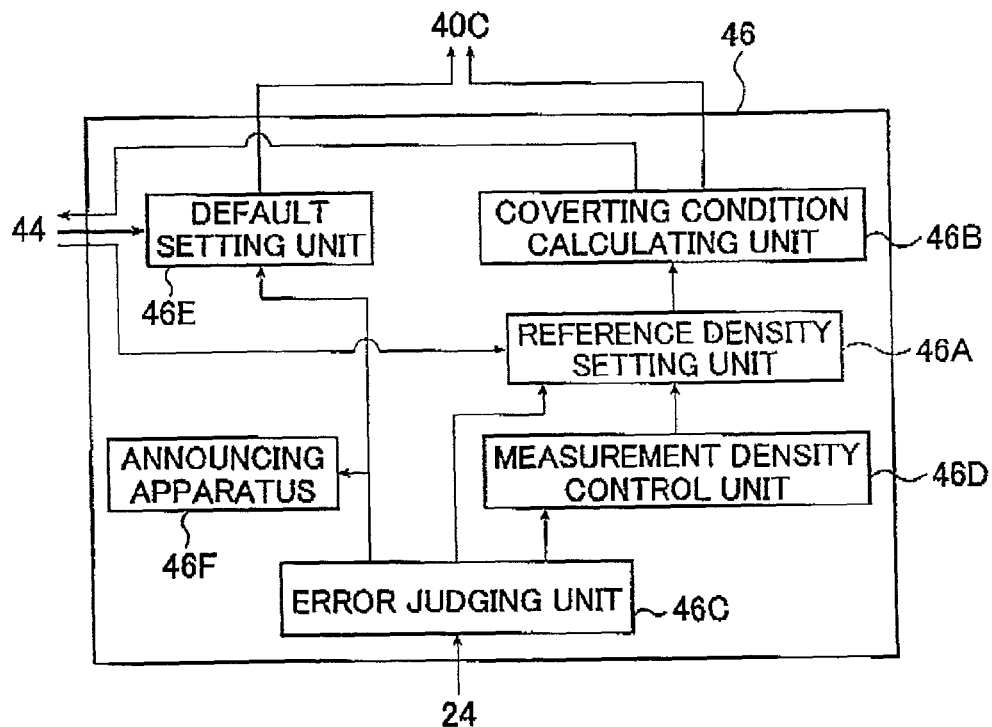
FIG. 2B is a schematic block diagram for showing an example of a structure of a major portion of the exposing unit shown in FIG. 1.

As indicated in FIG. 2B, the calculating unit 46 mainly contains a reference density value selecting unit 46A and a converting condition calculating unit 46B.

The reference density value selecting unit 46A selects a reference density values corresponding to measurement density values from the target density data E-D by using a measurement densities values $M_{k,l}$ (symbol k=1 to 6 and symbol l=C, M, or Y) of a test chart image with six patches having different density as to each of the three primary colors of C(cyan), M(magenta), and Y(yellow) And also the target density data E-D transferred from the memory unit 44. This measurement density values $M_{k,l}$ are measured by the density measuring unit 24. Hereinafter, these measurement density values $M_{k,l}$ will be simplified, and will typically represent measurement density values $M_k$ of one primary color among the three primary colors instead.

The converting condition calculating unit 46B calculates a target exposure light amount signal values of the test chart (target image signal values of a test chart in the present invention to be claimed) corresponding to the measurement density values $M_k$ from the reference density values selected in the reference density value selecting unit 46A by using the target density data E-D. Based upon both these target exposure light amount signal values and test chart output image signal values (will be discussed later), this converting condition calculating unit 46B calculates such an exposure light amount signal converting condition T which is adjusted from the exposure light amount signal converting condition T which is presently set by the second LUT 40C or the exposure light amount signal converting condition $T^{(O)}$ of the default setting operation, or, the exposure light amount signal converting condition T to be set to the second LUT 40C. Then, the converting condition calculating unit 46B supplies the calculated exposure light amount signal converting condition T to the second LUT 40C. The second LUT 40C holds the table of the supplied exposure light amount signal converting condition T as a one-dimensional LUT. It should be understood that the above-described selecting operation of the reference density values, and also the above-described calculation of the exposure light amount signal converting condition T will be explained later.

Furthermore, the calculating unit 46 contains an error judging unit 46C, a measurement density control unit 46D, a default setting unit 46E, and an announcing apparatus 46F. The error judging unit 46C judges as to whether or not an abnormal state occurs in measurement density values of a test chart image measured by the density measuring unit 24 (namely, as to whether or not error condition is satisfied). The measurement density control unit 46D removes such a measurement density value having an abnormal state based upon a judgement result. The default setting unit 46E calls the exposure light amount signal converting condition from the memory unit 44 in order to set this exposure light amount signal converting condition to the exposure light amount signal converting condition $T^{(O)}$ in response to a degree of an abnormal state, and then supplies the called exposure light amount signal converting condition to the second LUT 40C. The announcing apparatus 46F actuates a buzzer so as to notify an occurrence of an abnormal state in a measurement density values to operators when an abnormal state happens to occur, or displays a measurement density error.

It should be noted that in the signal converting unit 40 of this embodiment, the input image signal is converted into the exposure light amount signal, and then, this exposure light amount signal is converted into the output image signal. As indicated in FIG. 3, in the recording apparatus of the present invention, the input image signal I may be directly converted into the output image signal O, without employing the exposure light amount signal E as an intermediate signal.

In other words, while the input image signal I is used as the first image signal of the present invention to be claimed, the output image signal O may be used as the second image signal of the present invention, and also an LUT 40D may be employed as the image signal converting device of the present invention.

Figure 3:
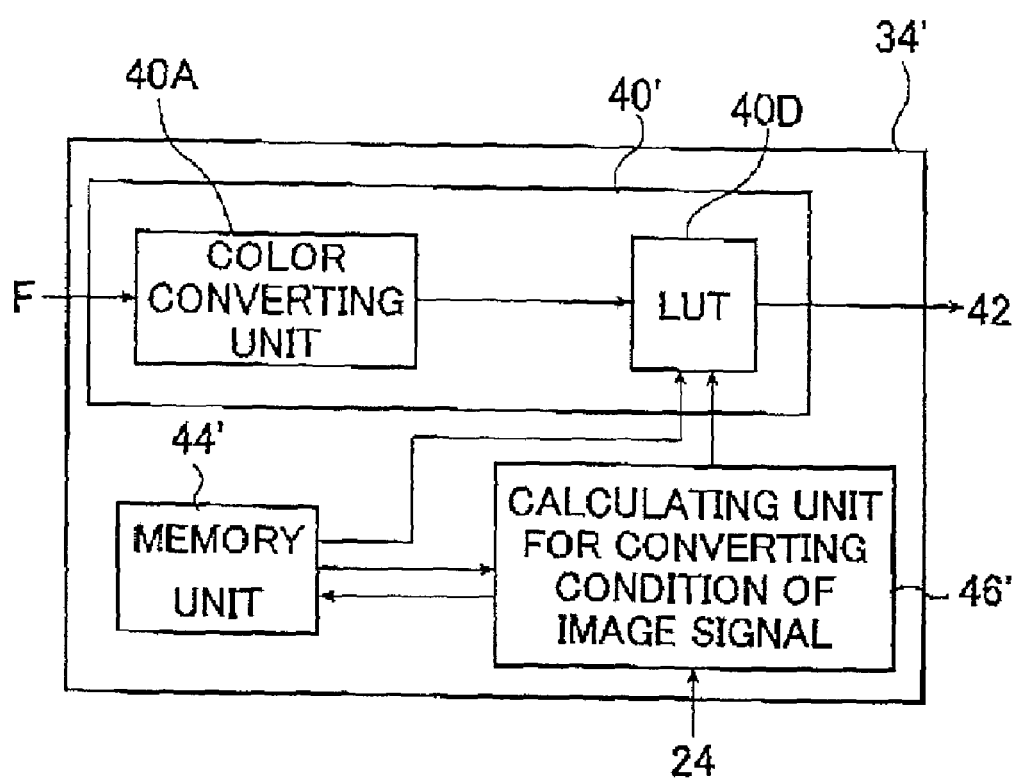
FIG. 3 is a schematic block diagram for representing another example of the structure of the exposing unit shown in FIG. 1.

In other words, an exposing unit 34' indicated in FIG. 3 is provided with a signal converting unit 40', a memory unit 44', and a calculating unit for image signal converting condition 46'.

The signal converting unit 40' is equipped with a color converting unit 40A' having the same structure as that of the color converting unit 40A shown in FIG. 2A, and the LUT 40D constituted by integrating the first LUT 40B with the second LUT 40C.

The LUT 40D is provided as an one-dimensional LUT, a table of an image signal converting condition I-O which converts the input image signal I into the output image signal O.

Also, the memory unit 44' is such a unit for storing thereinto the image signal converting condition I-O which is presently set as the one-dimensional LUT by the LUT 40D, the desirable target density data I-D which indicates a relationship between the input image signal I and the image density D, and the image signal converting condition of the default setting operation.

On the other hand, the calculating unit for the image signal converting condition 46' corresponds to such a unit for calculating an adjusted image signal converting condition to change the image signal condition presently set by the LUT 40D, or the image signal converting condition for setting the default setting operation, if necessary. The calculating for the image signal converting condition 46' calculates by employing both the test chart image measurement density values $M_k$ (k=1 to 6) having a plurality of patch images whose densities are different from each other and which is produced by the density measuring unit 24, and the target density data I-D supplied from the memory unit 44'. This calculating unit for the image signal converting condition 46' constitutes a converting condition calculating device of the present invention to be claimed. The calculating unit for the image signal converting condition 46' supplies the calculated image signal converting condition to the LUT 40D in order that the table of the calculated image signal converting condition is substituted by the table which is presently held by the LUT 40D.

It should also be noted that in the above-explained examples, while the test chart input image signal values are stored in the memory units 44 or 44', the test chart output image signal values are obtained via the first LUT 40B, the second LUT 40C, or the LUT 40D, and also this test chart output image signal values are supplied to the driver 42. Alternatively, in accordance with the present invention, the test chart output image signal values supplied to the driver 42 is previously stored in the memory unit 44, and then this test chart output image signal values may be directly supplied to the driver 42.

In the exposing unit 14, the recording material A on which the latent image is recorded is transported by three sets of transport roller pairs 48, and water functioning as the image forming solvent is applied on this recording material A by the water application unit 18, and further, the water-applied recording material A is transported to a register section 50.

On the other hand, while a pigment fixing material is coated on the image receiving surface of the image receiving material R, this image receiving material R is stored into a magazine 52 in the image receiving material supplying section 16 under such a condition that this image receiving material R is wound in a roll shape with keeping a long size thereof (image receiving plane is located on inner side of the roll shape), and then, the resultant magazine 52 is mounted on the recording apparatus 10.

Both an extracting roller pair 54 and a cutter 56 are positioned in the vicinity of the take-out port of the magazine 52. Only such a length of the image receiving material R, which is defined in accordance with a print to be formed, is extracted by the extracting roller pair 54, and then is cut out by the cutter 56. Thereafter, the cut image receiving material R is transported by three sets of transport roller pairs 58 to be supplied to a register roller pair 60. It should also be understood that in order to easily exfoliate the recording material A by an exfoliation finger 68 (will be discussed later), this image receiving material R is cut out, the length of which is slightly longer than that of the recording material A.

Both the register section 50 and the register roller 60 transport both the recording material A and the image receiving material R by making the timing coincident to each other, so that these recording material A and image receiving material R are overlapped and attached face to face with each other to be transported to the thermal developing/transferring section 20.

The thermal developing/transferring section 20 is constituted by belt conveyers 62/64 and a heater 66. Each of the belt conveyers 62/64 is constituted by an endless belt and a roller. The heater 66 is arranged so as to be included in the belt conveyer 62.

The two belt conveyers 62 and 64 sandwich and transport a laminated member made of the recording material A and the image receiving material R by using the respective endless belts. Then this laminated member is sandwiched/transported by the belt conveyers 62/64, the laminated member is heated by the heater 66, so that the latent image formed on the recording material A may be developed as a visible image. Furthermore, this visible image is transferred to the image receiving material R.

The exfoliation finger 68 is arranged in the down stream of the thermal developing/transferring unit 62.

When the tip portion of the laminated member constituted by the recording material A and the image receiving material R, to which both the thermal developing operation and the image transferring operation have been accomplished in the thermal developing/transferring section 62, is reached to the exfoliation finger 68, the exfoliation finger 68 is actuated to be inserted between both the recording material A and the image receiving material R. Thus, this exfoliation finger 68 may exfoliate the recording material A from the image receiving material R.

The recording material A which is exfoliated from the image receiving material R by the exfoliation finger 68 is fed by a transport roller pair 70 to the disposal material storing section 22.

The disposal material storing section 22 contains a drive device which is constituted by a drum 72, an endless belt 74 wound on the drum 72 (namely, outermost layer of the recording material A), and rollers 76, 76, - - -, over which this endless belt 74 is tensioned. The used recording material A is taken up by the drum 72, and when a predetermined amount of used recording materials is wound on this drum 72, these recording materials are disposed.

On the other hand, the image receiving material R from which the recording material A has been exfoliated is transported by transport roller pairs 78, 78, - - -, and is further ejected by an ejection roller 80 to a tray 82 as a hard copy on which an image is recorded.

In this case, the density measuring section 24 is arranged between the transport roller pair 78 located in the lowermost stream and the ejection roller 80.

When the recording apparatus 10 is calibrated, the density measuring section 24 executes a density measurement of a test chart image, and then acquires a plurality of measurement density values $M_1$ to $M_6$ with respect to each of the respective three primary colors. The test chart image is made of 18 patches (6 patches×3) in total, and these patches are constituted by three primary colors of C(cyan), M(magenta), and Y(yellow), the densities of which are changed, and are recorded latently on the recording material A and then formed on the image receiving material R. In other words, this density measuring section 24 constitutes a density measuring device of the present invention to be claimed.

The density measuring section 24 is constituted by a projection system of measuring light, and a reception system of measuring light.

The measuring light projection system is arranged by employing three light sources (not shown), a driver (not shown) for driving the respective light sources, and a turn-ON control unit (not shown) for controlling the driver so as to control turn-ON operations of the respective light sources. The three optical sources correspond to density measurements of the C(cyan) patch, the M(magenta) patch, and the Y(yellow) patches of the test chart image recorded on the image receiving material R.

On the other hand, the measuring light reception system is arranged by employing a sensor (not shown), a focusing optical system (not shown) for focusing reflection light onto the sensor, an amplifier (not shown) for amplifying the output signal of the sensor, an A/D converter (not shown), and a data processing unit (not shown). The sensor senses an amount of light of the reflection light from the image receiving material R, and an amount of light of the reflection light from a white-colored reference plate 26.

The density measuring unit 24 is so arranged that the measurement density values $M_1$ to $M_6$ of the C(cyan) patch, the M(magenta) patch, and the Y(yellow) patch, which are measured, are supplied to the calculating unit 46 of the exposing section 34.

In this case, the test chart image measured by the density measuring unit 24 is arranged by such 18 patches that the patches in which the densities of the three primary colors of C(cyan), M(magenta), and Y(yellow) are varied are lined up in one row. As a result, the measurement time required for measuring the density by the density measuring section 24 can be largely reduced, as compared with the conventional test chart image. That is, while a total number of patches is selected to be 72 patches (24 patches×3) in order to improve the calibration precision, the conventional test chart image is made by arranging a plurality of patch arrays. Moreover, since the plural rows of patches are arrayed in the conventional test chart image, the density measurement must be carried out by scanning these patches along the sub-scanning direction as well as the main scanning direction, which requires a cumbersome operation in the light reception system. To the contrary, in the image recording apparatus of the present invention, since the patches of the test chart image measured in the density measuring unit 24 are six in total as to each of the three primary colors, only one row of these patches is sufficiently needed, so that any sub-scanning transport device of the density measuring section 24 is no longer required. As explained above, the operation in which total patch number of the test chart image is reduced and the calibration can be carried out may be achieved by an image recording method of the present invention (will be explained later). This image recording method will be described later in detail.

The recording apparatus 10 is structured as described above.

Next, the image recording method according to the present invention will be described based upon the above-explained recording apparatus 10.

The image recording method according to the present invention is a method of recording an image as follows. That is, before the input image signal I is converted into the output image signal O in the exposing section 34, the signal converting condition such as the image signal converting condition, e.g., the exposure light amount signal converting condition T is calculated with high precision and furthermore within a short time period such that an image having proper image density is outputted from the input image signal I, and then, the signal conversion is carried out with respect to the input image signal I based upon this calculated image signal conversion condition, so that the image is recorded.

Figure 4:
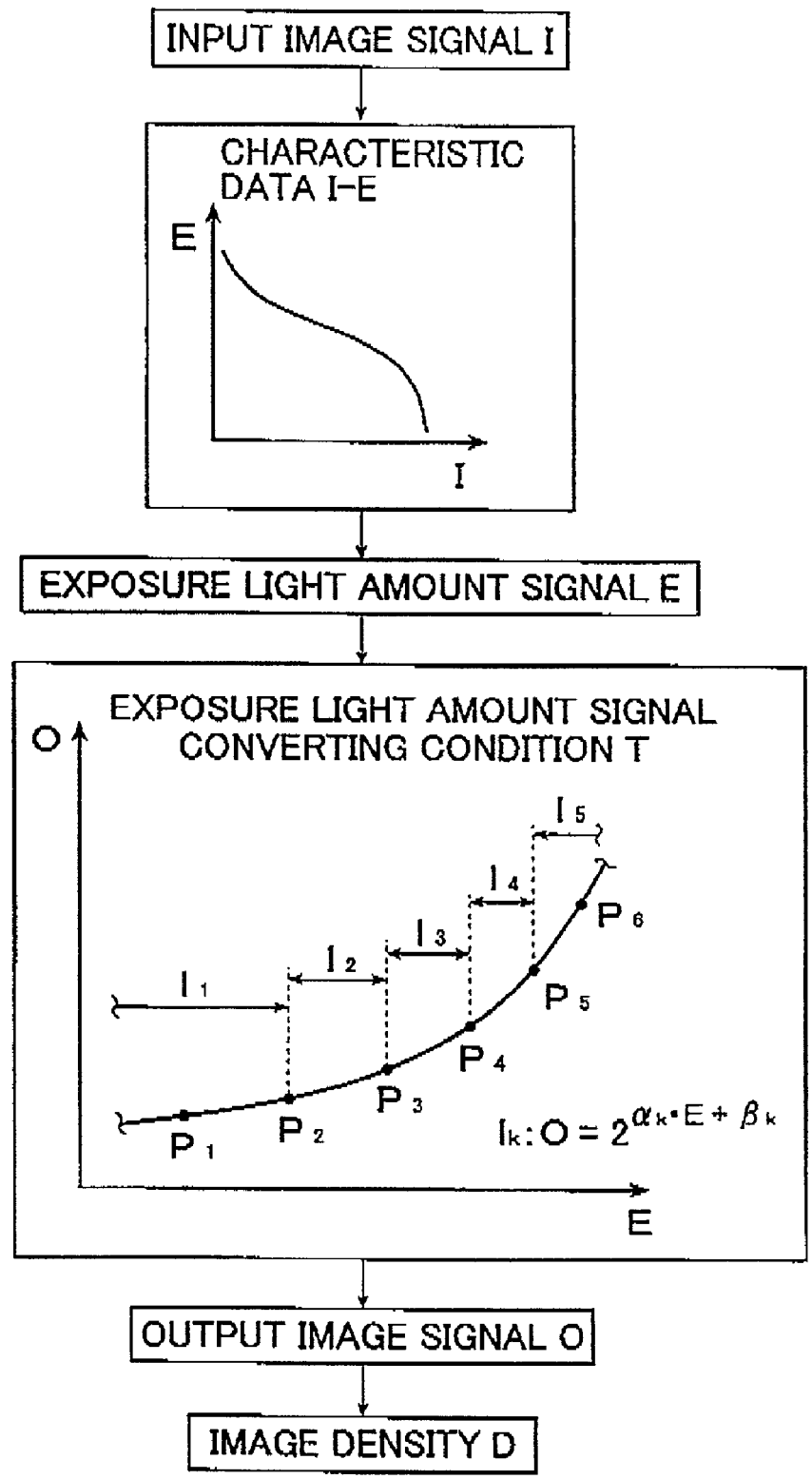
FIG. 4 is an explanatory diagram for explaining an overall operation of the image recording method according to the present invention, which is executed in the image recording apparatus of the present invention.

As an example of such an image recording method according to the present invention, an image recording method executed in the above-described recording apparatus 10 is indicated in FIG. 4. This image recording method is featured by that before a desirable image is recorded, the exposure light amount signal converting condition T is calculated by employing a test chart image so as to calibrate the recording apparatus 10.

In this case, the image recording method is featured as follows. That is, while using the characteristic data I-E defined based upon the sort of the recording material A, an 8-bit input image signal I is converted into a 10-bit exposure light amount signal E. This exposure light amount signal E is converted into a 12-bit output image signal O by employing the exposure light amount signal converting condition T which converts this exposure light amount signal E into the output image signal O. While this output image signal O is employed, the image is exposed/recorded on the recording material A by the driver 42 by using the R-light source, the G-light source, and the B-light source.

In this case, the exposure light amount signal converting condition T is calculated by employing the measurement density values $M_k$ (k=1 to 6) obtained by measuring the densities of the test chart image, and also the target density data E-D which is set based upon the sort of the recording material A in such a case that, for instance, a total number of patches of the respective primary colors of the test chart image is equal to 6. This exposure light amount signal converting condition T is determined by a conversion curve $l_k$ (k=1 to 5) which is subdivided into a plurality of regions of the image density value, and the conversion curve $l_k$ may be determined by both a conversion parameter $\alpha_k$ (k=1 to 5) and another conversion parameter $\beta_k$ (k=1 to 5). In other words, the calculation of the exposure light amount signal converting condition T is carried out by calculating both the conversion parameter $\alpha_k$ and the conversion parameter $\beta_k$. In this case, the reason why the symbol k of the measurement density value $M_k$ is equal to 1 to 6 whereas the symbols k of the conversion parameters $\alpha_k$ and $\beta_k$ and also the symbol k of the conversion curve $l_k$ are equal to 1 to 5 is given as follows. As indicated in FIG. 4, for instance, a conversion curve in a region between $P_5$ and $P_6$, which are determined by both the measurement density value $M_5$ and the measurement density value $M_6$ is expressed by a conversion curve $l_5$, and conversion parameters are expressed by the conversion parameters $\alpha_5$ and $\beta_5$. It should also be noted that both a conversion curve of such a region lower than an exposure light amount signal value of $P_1$ which is determined by the measurement density value $M_1$, and another conversion curve of such a region higher than an exposure light amount signal value of $P_6$ which is determined by the measurement density value $M_6$ are employed by extending the conversion curves $l_1$ and $l_6$, respectively, as indicated in FIG. 4.

In the below-mentioned example, a total number of patches of a test chart image is selected to be 6 patches with respect to each of the three primary colors. However, apparently, according to the present invention, the number of patches is not limited to 6.

Figure 5:
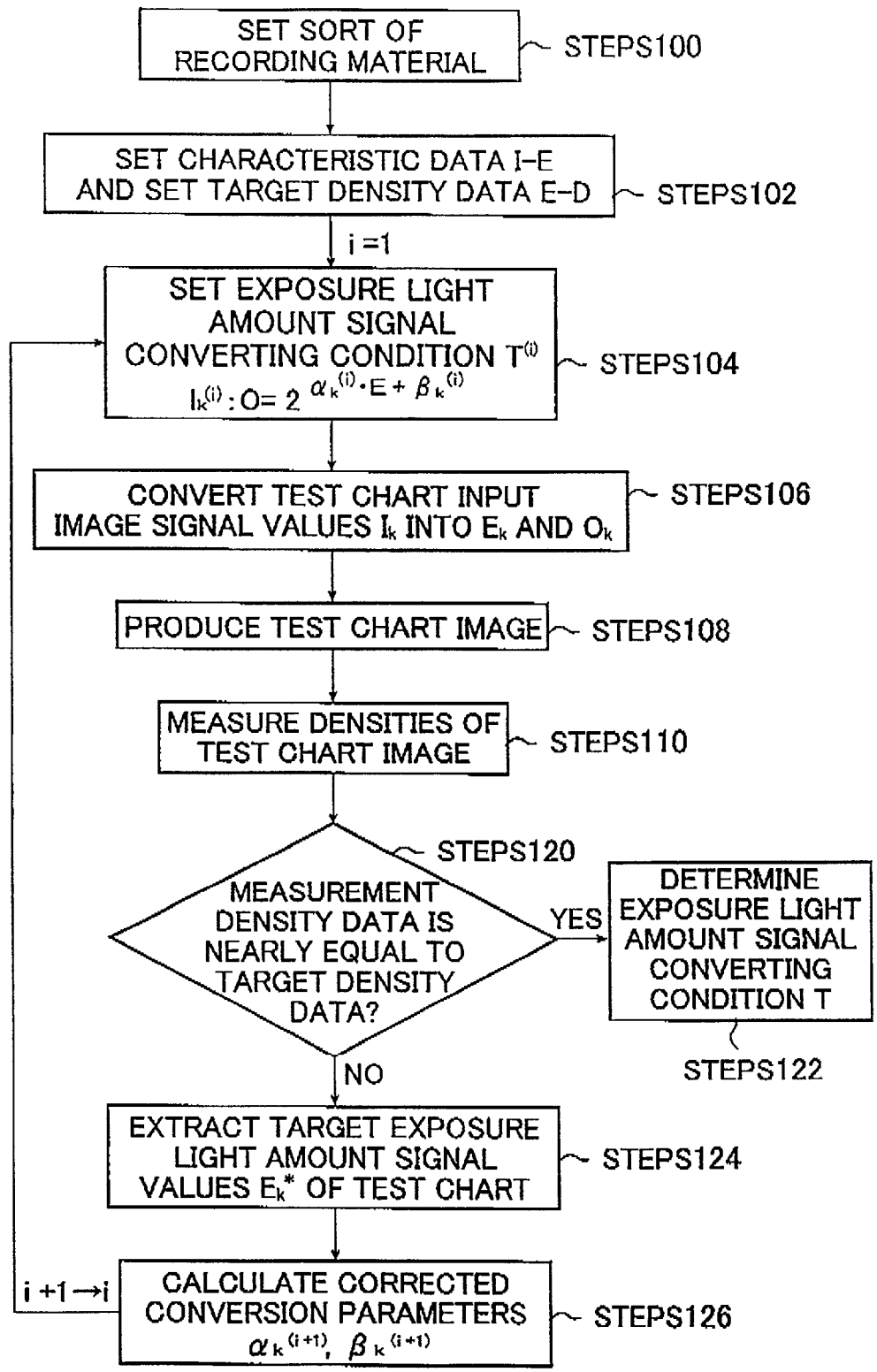
FIG. 5 is a flow chart for explaining an operation of the image recording method according to the present invention, which is executed by the image recording apparatus of the present invention.

FIG. 5 is a flow chart for describing an operation up through such operation that the exposure light amount signal converting condition T is calculated and then determined.

First, when the power supply of the recording apparatus 10 is turned ON so as to initiate the recording apparatus 10, a sort of a recording material A is inputted/set from a control panel (not shown) of the recording apparatus 10 by an operator (step 100). Alternatively, the ID information of the magazine 28 set to the recording apparatus 10 is automatically read, and the sort of the recording material A may be automatically inputted/set.

Using the set information of the recording material A, both the characteristic data I-E which is recorded in accordance with the sort of this recording material A, and also the target density data E-D which indicates the relationship between the exposure light amount signal E of the recording material A and the image density D are called in the memory unit 44. This characteristic data I-E is sent to the first LUT 40B, and the target density data E-D is sent to the calculating unit 46. In this first LUT 40B, the table of the characteristic data I-E is set (step 102).

Figure 6:
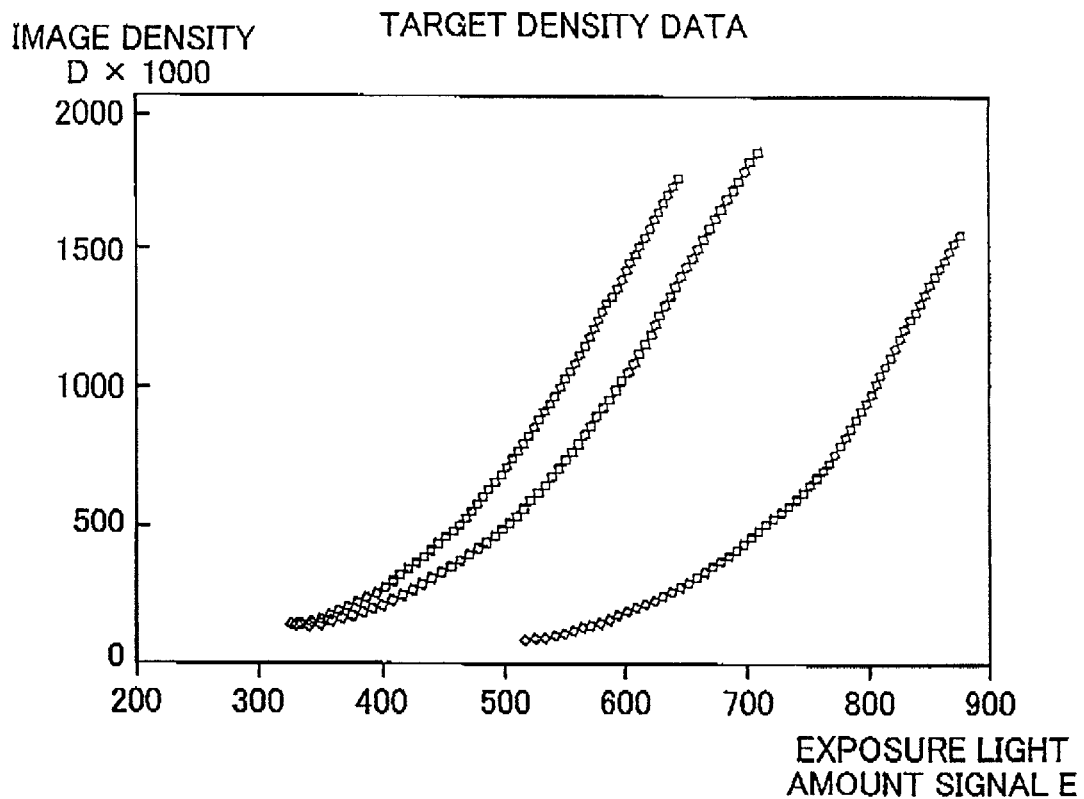
FIG. 6 is a diagram for representing an example of target density data used in the image recording method of the present invention.

As the target density data E-D supplied to the calculating unit 46, such data as indicated in FIG. 6 may be used. In this case, three data groups indicated in FIG. 6 are target density data of the three primary colors of C, M and Y.

Furthermore, the exposure light amount signal converting condition T which is presently recorded in the memory unit 44 is called from the memory unit 44, and then, a table of an exposure light amount signal converting condition $T^{(1)}$ (corresponding to i=1 of exposure light amount signal converting condition $T^{(i)}$) is set to the second LUT 40C (step 104). In this case, the exposure light amount signal converting condition $T^{(1)}$ is set as follows. That is, while the range of the output image signal O is previously subdivided into a plurality (m pieces) of regions, a conversion curve $l_k^{(1)}$ (k=1 to m) is set every sub-divided regions by way of a conversion parameter $\alpha_k^{(1)}$ (k=1 to m) and another conversion parameter $\beta_k^{(1)}$ (k=1 to m), as expressed by the below-mentioned formula (1) (i=1) within a range of this sub-divided regions. As a result, the exposure light amount signal converting condition $T^{(1)}$ is set.

$$l_k^{(i)}: O = 2^{\alpha_k^{(i)} E + \beta_k^{(i)}} \tag{1}$$

Figure 7:
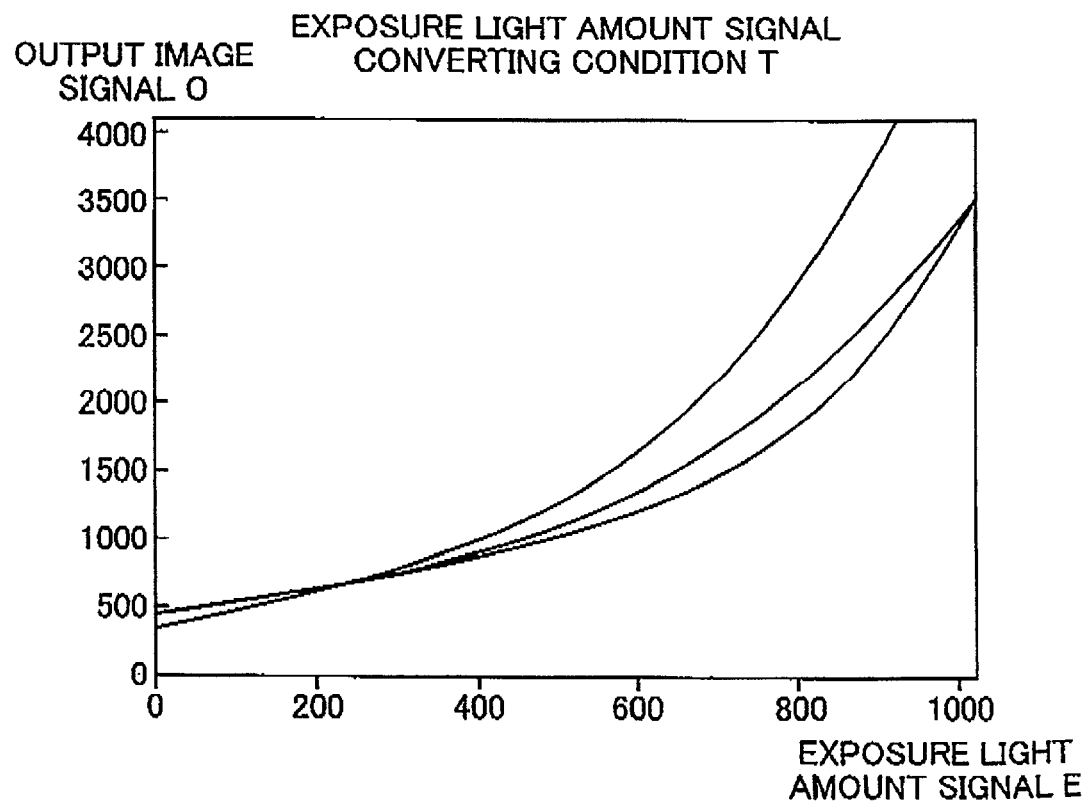
FIG. 7 is a diagram for showing an example of an exposure light amount signal converting condition employed in the image recording method of the present invention.

In other words, the exposure light amount signal converting condition $T^{(1)}$ is set in such a way that the conversion curve $l_k^{(1)}$ (k=1 to m) for converting the exposure light amount signal E into the output image signal O is set with respect to each of the regions. As the image signal converting condition $T^{(1)}$, for example, such a conversion curve as indicated in FIG. 7 may be employed. In this example, the three conversion curves correspond to conversion curves of the three primary colors C, M, and Y.

Next, test chart input image signal values $I_k$ (k=1 to 6) of each of the R-test chart image, the G-test chart image, and the B-test chart image, which have predetermined values and are recorded in the memory unit 44, are called, and then are converted into a test chart exposure light amount signal values $E_k$ (k=1 to 6) by employing the characteristic data I-E in the first LUT 40B. Thereafter, in the second LUT 40C, the test chart exposure light amount signal values $E_k$ (k=1 to 6) are converted into a test chart output image signal values $O_k$ (k=1 to 6) by employing the above-described exposure light amount signal converting condition $T^{(1)}$ (step 106). In this case, since the characteristic data I-E corresponds to such data which is determined based upon the sort of the recording material A, the test chart exposure light amount signal values $E_k$ become constant values once the characteristic data I-E is employed. On the other hand, the test chart output image signal values $O_k$ correspond to values which are varied in response to the set exposure light amount signal converting condition $T^{(1)}$.

Thereafter, while the test chart output image signal values $O_k$ (k=1 to 6) are used, a test chart image is exposed/recorded on the recording material A in the driver 42, and then, the exposed/recorded test chart image is transferred to the image receiving material R so as to produce a desirable test chart image (step 108).

In the density measuring section 24, densities of the produced test chart image are measured (step 110), and then, measurement density values $M_k$ (k=1 to 6) are obtained which correspond to the respective patches of the test chart image. The resultant measurement density values $M_k$ (k=1 to 6) are supplied to the calculating unit 46, Next, in the calculating unit 46, a judgement is made as to whether data of an exposure light amount signal-density, namely, density measurement data is made coincident with the target density data E-D determined at the step 102, or is made coincident within an allowable error range, namely, substantially made coincident) (step 120). This data of exposure light amount signal-density is composed of pairs of the measurement density values $M_k$ (k=1 to 6) and the test chart exposure light amount signal values $E_k$ (k=1 to 6). In such a case that it is so judged that the density measurement data is substantially made coincident with the target density data E-D, the exposure light amount signal converting condition $T^{(1)}$ is determined as the exposure light amount signal converting condition T (step 122). When it is not so judged that the density measurement data is substantially made coincident with the target density data E-D, the exposure light amount converting condition $T^{(1)}$ is repeatedly calculated based upon the below-mentioned method such that a relationship between the exposure light amount E of the test chart image and the image density D, namely, density measurement data, can be substantially made coincident with the target density data E-D.

Figure 8:
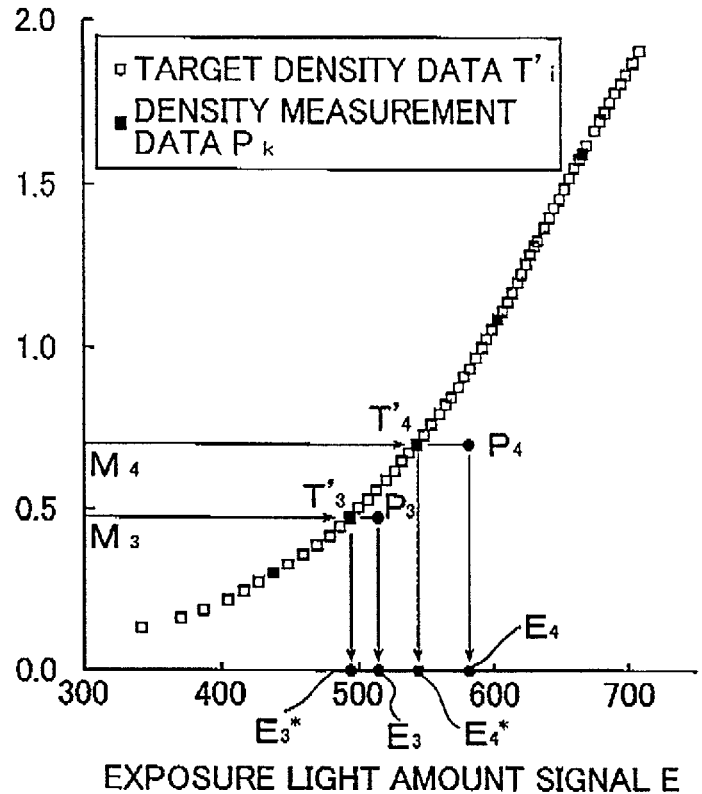
FIG. 8 is a diagram for explaining a prediction/calculation method of test chart target exposure light amount signal values used in the image recording method of the present invention.

First, while using the target density data E-D set at the previous step 102, target exposure light amount signal values $E_k^*$ (k=1 to 6) of the test chart corresponding to the measurement density values $M_k$ (k=1 to 6) are calculated from the measurement density values $M_k$ (k=1 to 6) of the test chart image (step 124). FIG. 8 shows an example in which both a test chart target exposure light amount signal value $E_3^*$ and another test chart target exposure light amount signal value $E_4^*$ are calculated from both the measurement density value $M_3$ and the measurement density value $M_4$. The calculation method is carried out by way of a linear interpolation by employing a pair of the target density values among the target density data E-D which are located at the nearest position to each the measurement density values $M_k$ (k=1 to 6), so as to sandwich the measurement density values $M_k$, namely a pair of reference density values. As indicated in FIG. 8, since there are large numbers of target density data which are plotted by symbol ■(total data number is 64), the test chart target exposure light amount signal values $E_k^*$ (k=1 to 6) corresponding thereto can be calculated in high precision from the pair of the reference density values corresponding to the measurement density values $M_k$ (k=1 to 6) by using the target density data E-D, even when the measurement density values $M_k$ (k=1 to 6) plotted by symbol □ is located in any range. A total data number of the target density data employed in this embodiment becomes 64 with respect to the total number (6) of the measurement density values $M_k$ (k=1 to 6), and since the total data number of the target density data is much larger than the total data number of the measurement density values $M_k$, the test chart target exposure light amount signal values $E_k^*$ (k=1 to 6) can be calculated from the measurement density values $M_k$ (k=1 to 6) with very high precision.

Alternatively, the above-explained calculation method of the target exposure light amount signal values $E_k^*$ (k=1 to 6) may be replaced by the following method. That is, while such a reference density value is selected which is extremely approximated to each of the measurement density values $M_k$ (k=1 to 6), an exposure light amount signal value corresponding to the selected reference density value may be employed as the target exposure light amount signal values $E_k^*$ (k=1 to 6).

Figure 9:
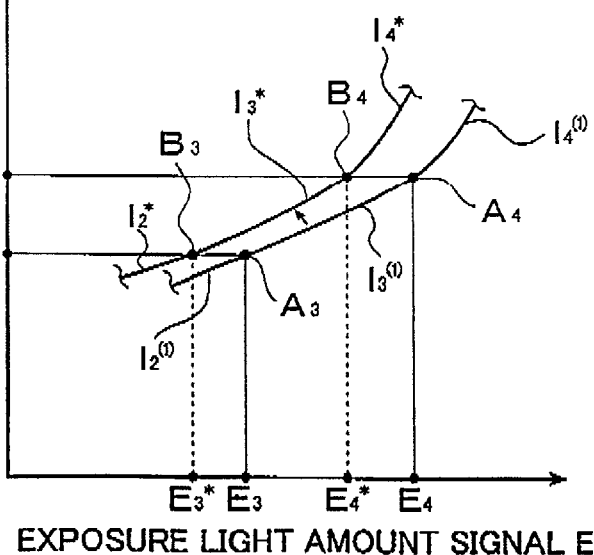
FIG. 9 is a diagram for explaining an adjusting method of the exposure light amount signal converting condition employed in the image recording method of the present invention.

FIG. 9 represents an example of a relationship between the calculated target exposure light amount signal values $E_k^*$ (k=1 to 6) and the test chart image output signal values $O_k$ (k=1 to 6). A conversion curve $l_3^{(1)}$ shown in FIG. 9 corresponds to such a conversion curve defined by that k=3 and i=1 in the conversion curve $l_k^{(i)}$ of the formula (1). In other words, the conversion curve $l_3^{(1)}$ is such a conversion curve whose region is defined by both a test chart output image signal value $O_3$ and another test chart output image signal value $O_4$.

In this case, both the conversion parameters $\alpha_3^{(1)}$ and $\beta_3^{(1)}$ defined in the above-explained formula (1) are adjusted in order that a point $A_3$ located between the test chart exposure light amount signal value $E_3$ and the test chart output image signal value $O_3$ is converted into another point $B_3$ located between the target exposure light amount signal value $E_3^*$ and the test chart output image signal value $O_3$, and furthermore, in order that a point $A_4$ located between the test chart exposure light amount signal value $E_4$ and the test chart output image signal value $O_4$ is converted into another point $B_4$ located between the target exposure light amount signal value $E_4^*$ and the test chart output image signal value $O_4$, namely, in order that the conversion curve $l_3^{(1)}$ is converted into $l_3^*$.

Concretely speaking, the conversion parameters, namely, conversion parameters $\alpha_3^{(2)}$ and $\beta_3^{(2)}$, are calculated by employing the below-mentioned formulae (2) and (3) using both the chart target exposure light amount signal values $E_3^*$, and $E_4^*$, and also the test chart output image signal values $O_3$ and $O_4$.

$$\alpha_3^{(2)} = \frac{\log_2 O_3 - \log_2 O_4}{E_3^* - E_4^*} \quad (2)$$

$$\beta_3^{(2)} = \log_2 O_3 - \alpha_3^{(2)} \cdot E_3^* \quad (3)$$

As explained above, the conversion parameter $\alpha_k^{(2)}$ (k=1 to 5) and the conversion parameter $\beta_k^{(2)}$ (k=1 to 5) are calculated every region (step 126). The calculated conversion parameters $\alpha_k^{(2)}$ and $\beta_k^{(2)}$ are set as a parameter of such an exposure light amount signal converting condition $T^{(2)}$ produced by adjusting the exposure light amount signal converting condition $T^{(1)}$, and a table of the exposure light amount signal converting condition $T^{(2)}$ is set in the second LUT 40C (step 104).

Based upon the exposure light amount signal converting condition $T^{(2)}$ set in the above-explained manner, the process operation defined from the steps 104 to 110 are again repeatedly carried out. At the step 120, a judgement is made as to whether or not the measurement density data is substantially made coincident with the target density data E-D. It should be understood that the expression "substantially coincident" implies the following cases. That is, the measurement density data is completely made coincident, and is approximated to the target density data E-D. Also, the expression "approximated to target density data" implies such a condition that a difference between the measurement density data and the target density data E-D is involved in a predetermined range. In the case that it is not so judged that the measurement density data is substantially made coincident with the target density data E-D, the process operations defined from the steps 104 to 110 are again repeated. At the step 120, a judgement is made as to whether or not the measurement density data is substantially made coincident with the target density data E-D.

As described above, the process operations defined from the steps 104 to 110, the step 120, and the steps 124/126 are repeated until the density measurement data is substantially made coincident with the target density data, which is judged at the step 120, so that an exposure light amount signal converting condition $T^{(i)}$ is sequentially calculated.

Based on the judgement executed at the step 120, the exposure light amount signal converting condition $T^{(i)}$ is finally determined as the exposure light amount signal converting condition T, and the table of this exposure light amount signal converting condition T is set to the second LUT 40C. Thus, the recording apparatus 10 can be calibrated. The determined exposure light amount signal converting condition T, for example, both the conversion parameters $\alpha_k$ (k=1 to 5) and $\beta_k$ (k=1 to 5), and the data about the table of the exposure light amount signal converting condition T is stored in the memory unit 44. This stored exposure light amount signal converting condition T is used as an exposure light amount signal converting condition $T^{(1)}$ which is set when the power supply is turned ON while the next image recording operation by the recording apparatus is carried out.

Conventionally, when the exposure light amount signal converting condition is sectionally subdivided in the above-explained manner and is calculated with respect to each of the regions so as to adjust the exposure light amount signal converting condition, the regional subdivision is carried out while employing the output image signal value corresponding to each of the density values of the target density data E-D as the standard, and then the exposure light amount signal converting condition is calculated. As a result, in order to execute the calibration in high precision, the linear interpolation should be carried out by narrowing the interval between the output image signal values corresponding to two of the density measurement values which interpose the output image signal value of the target density data constituting the standard data. As a consequence, while a large number of the patches contained in the test chart image are set, a total number of such data about the measurement density values acquired from the test chart image must be necessarily made larger than a total number of such data about the target density data E-D.

However, in accordance with the present invention, while the test chart output image signal values $O_k$ (k=1 to 6) corresponding to the measurement density values $M_k$ (k=1 to 6) are used as the standard values, the exposure light amount signal converting condition is sectionally subdivided. As a result, in order to calibrate the recording apparatus in high precision, a large number of the data about the target density data may be previously set. Therefore, a total patch number of the test chart image can be reduced, and also the total data number of the measurement density values $M_k$ (k=1 to 6) can be made smaller than that of the target density data E-D.

After the exposure light amount signal converting condition T is determined and the second LUT 40 is set, the 8-bit input image signal I is supplied from the image signal supply source F of a scanner (image reading apparatus), a photograph means such as a digital camera, an image processing apparatus or the like, then the 8-bit input image signal I is converted into the output image signal O via the 10-bit exposure light amount signal E in the signal converting unit 40. This output image signal O is supplied to the driver 42. In this driver 42, the above-explained optical beams of the respective light sources are modulated in response to this output image signal O to drive these optical beam light sources. Thus, the recording material A is exposed to record the image, so that such an image having desirable image density may be formed on the image receiving material R.

In the above-described example, the test chart image used to adjust the image signal converting condition is produced such that the test chart input image signal values $I_k$ (k=1 to 6) stored in the memory unit 44 are called, and then, are converted via both the first LUT 40B and the second LUT 40C into the test chart output image signal values $O_k$ (k=1 to 6). Alternatively, while the test chart output image signal values $O_k$ (k=1 to 6) stored in the memory unit 44 is previously called, the test chart image may be produced based upon this called test chart output image signal values. As a result, the desirable exposure light amount signal converting condition T may be calculated while the setting operation of the exposure light amount signal converting condition $T^{(i)}$ executed at the step 104 is not previously carried out.

Figure 10:
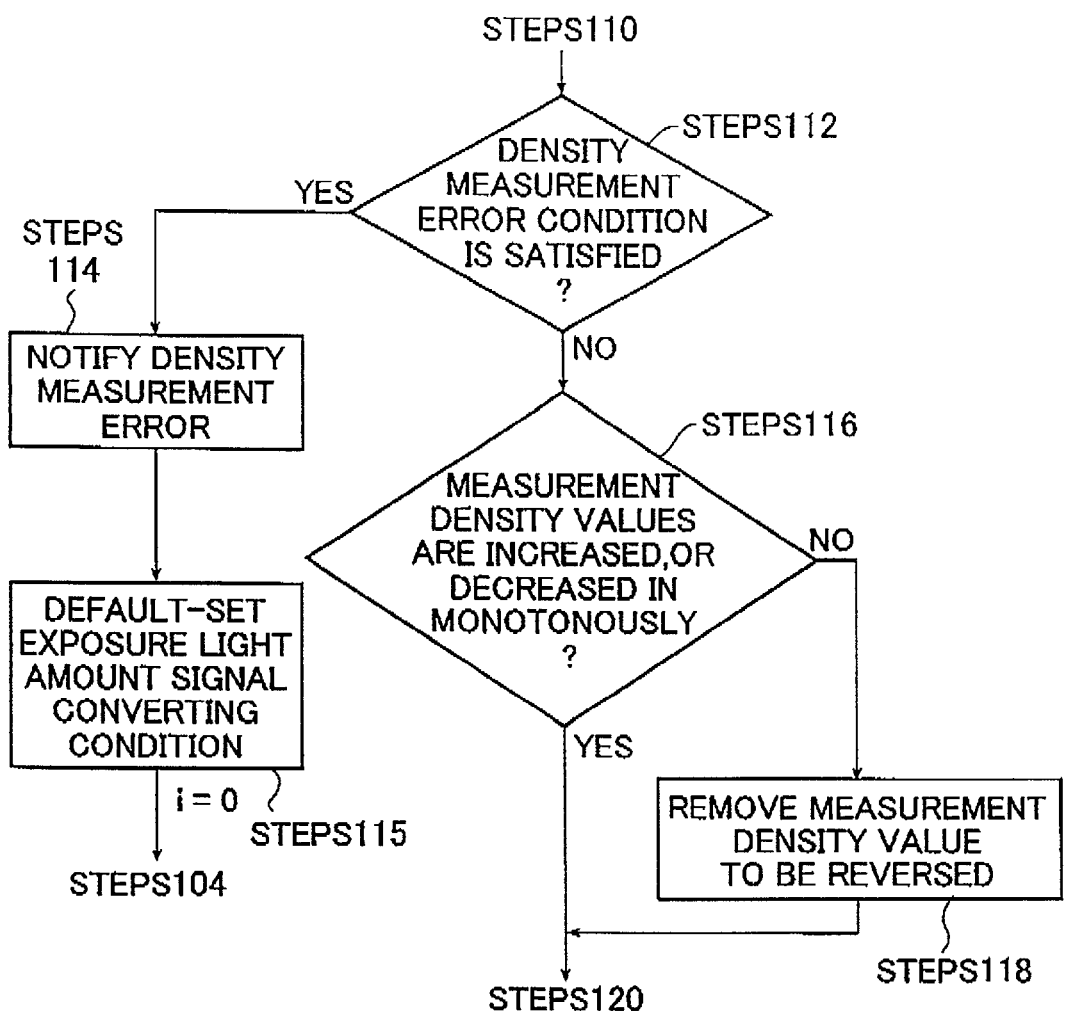
FIG. 10 is a flow chart for explaining another example of an operation of an image recording method according to the present invention, which is executed in the image recording apparatus of the present invention.

Also, in the calculating unit 46, such steps shown in FIG. 10 is executed between the step 110 and the step 120 indicated in FIG. 5 by employing the error judging unit 46C, the measurement density control unit 46D, the default setting unit 46E, and the announcing apparatus 46F. In other words, after the measurement of the density of the test chart image (step 110), the calculating unit 46 judges as to whether or not the measurement density values $M_k$ (k=1 to 6) satisfy the density measurement error condition (step 112). In this case, the density measurement error condition implies such a measurement density values $M_k$ that the images of all of the patches may become pure white, or another case that although the patches are arranged in the order of density values, such a measurement density values that the measurement density values $M_k$ are largely reversed in the order may be obtained.

Such a density measurement error condition is defined by an allowable range of a measurement density value every patch. When the density measurement error condition can be satisfied, the buzzer is actuated to produce the notification to the operator. Alternatively, the operator is notified by displaying the density measurement error on the control panel (step 114). Thereafter, the exposure light amount signal converting condition T is default-set by such a way that the previously-registered exposure light amount signal converting condition $T^{(0)}$ is called from the memory unit 44 (step 115), and then, the process operation is returned to the step 104. Then, as i=0, the exposure light amount signal converting condition is set in the second LUT 40C. When the density measurement error condition can not be satisfied at the step 112, a judgement is made (step 116) as to whether or not there is such a measurement density value $M_k$ which does not vary by the density difference within a predetermined range and is reversed with a measurement density value of the patches adjacent to each other, in other word, the values of the measurement density values $M_k$ do not vary in either a monotonous increase manner or a monotonous decrease manner in correspondence with the patch arranging sequence although the density values of the patches are arranged in the original patch arranging sequence. In the case that the measurement density value $M_k$ whose density value is reversed in the order can be formed among the measurement density values $M_k$ (k=1 to 6), this measurement density value $M_k$ is removed (step 118). Then, process operations defined after the step 120 are carried out by employing the measurement density values after the removal. When an abnormal state occurs in the measurement density values $M_k$ (k=1 to 6), even though the abnormal measurement density value $M_k$ is eliminated, the exposure light amount signal converting condition can be calculated without reducing the precision thereof.

Figure 11:
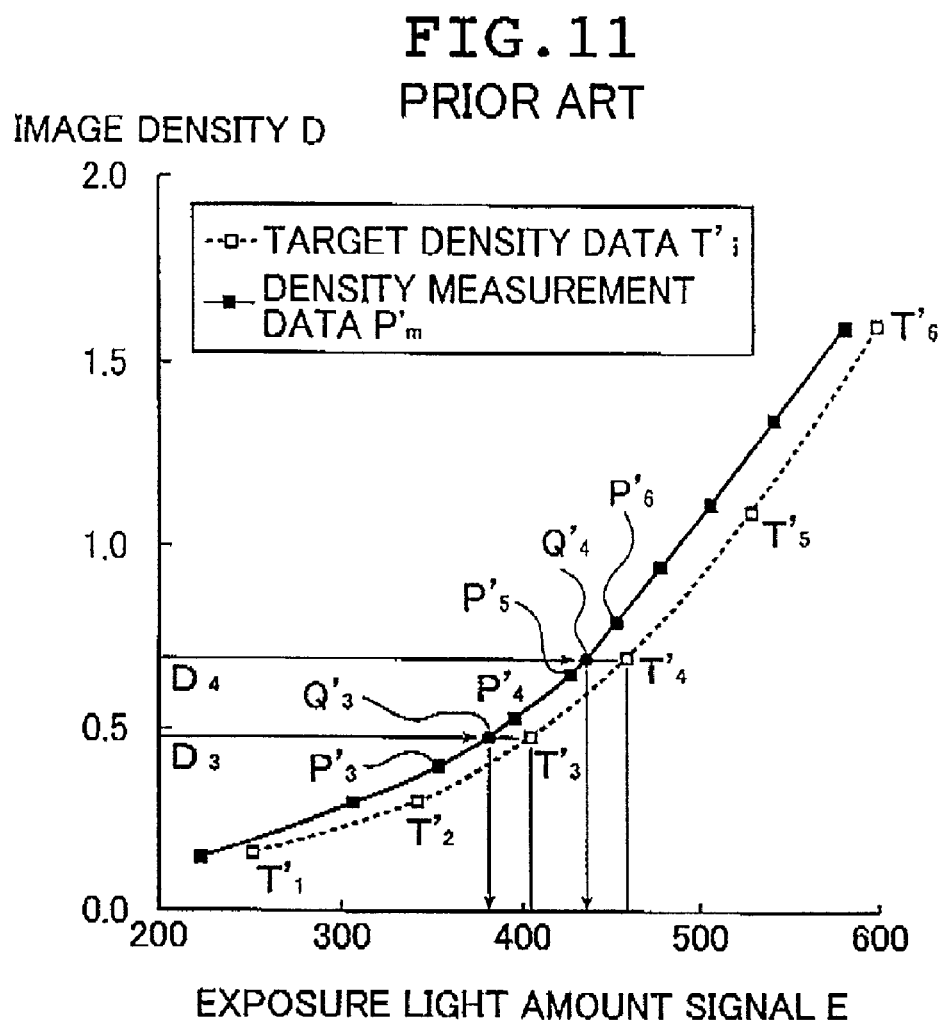
FIG. 11 is a diagram for explaining the method of calculating the exposure light amount signal values from the target density data, which is executed in the conventional image recording method.

As explained above, the reason why the exposure light amount signal converting condition can be calculated without reducing the precision even though the abnormal measurement density value $M_k$ is removed is given as follows. That is, the total data number of the target density data E-D is much larger than that of the density measurement values $M_k$, and the test chart target exposure light amount signal values $E_k^*$ corresponding to the density measurement values $M_k$ can be calculated in high precision. Conventionally, for example, as shown in FIG. 11, while the target density data $T_3'$ and $T_4'$ are fixed, the calculation is made on the exposure light amount signal values at the point $Q_3'$ and $Q_4'$ corresponding to the density values $D_3$ and $D_4$ of the target density data $T_3'$ and $T_4'$ by employing the two density measurement data $P_3'$ and $P_4'$, and $P_5'$ and $P_6'$, which sandwich the density values $D_3$ and $D_4$ of these target density data $T_3'$ and $T_4'$. Thus, a large number of the density measurement data Pm' is needed in order to enhance precision of the exposure light amount signal values. As a result, even when such a small error is produced in the measurement density values, this error may give the adverse influence on the calculation of the exposure light amount signal, and finally, the precision of the exposure light amount signal converting condition T gets lowered. When one of the density measurement data is removed, this may give a very large influence on the calculation of the exposure light amount signal, which may lower the calculation precision. As a result, the density measurement data could not be removed in the prior art.

As previously explained, in accordance with the present invention, as illustrated in FIG. 8, the target exposure light amount signal values of the test chart $E_k^*$ (k=1 to 6) corresponding to the measurement density values $M_k$ (k=1 to 6) are calculated from the target density data $T_i'$ whose data number is larger than that of the measurement density values $M_k$ (k=1 to 6), while using the two reference density values. The two reference density values put therebetween each of the measurement density values $M_k$ (k=1 to 6), and are located at the nearest value as to the density value. As a consequence, the precision in the finally calculated exposure light amount signal converting condition T is not lowered, while the calculation precision is not lowered depending upon total number of density measurement data.

Figure 12:
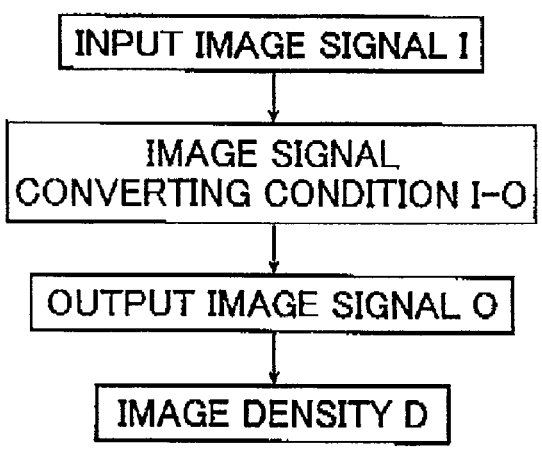
FIG. 12 is a diagram for explaining a further example of an entire operation of an image recording method according to the present invention, which is executed in the image recording apparatus of the present invention.
Figure 13:
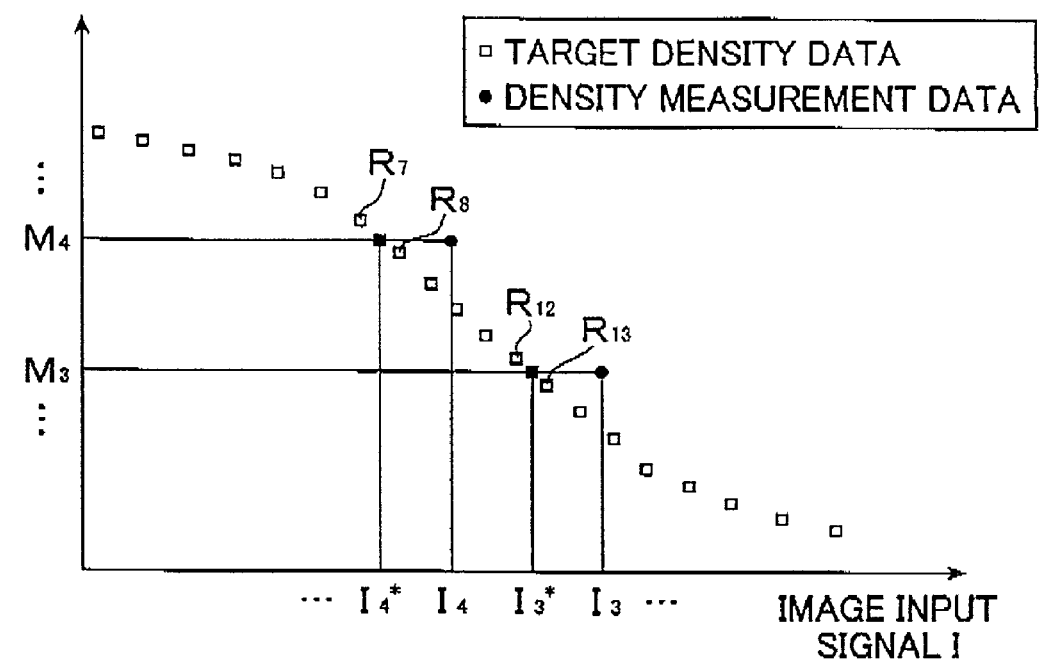
FIG. 13 is a diagram for explaining a prediction/calculation method of test chart target input image signal values, which is executed in the example of FIG. 12.

It should also be noted that in the above-explained embodiment, the input image signal I is converted into the exposure light amount signal E corresponding to the intermediate signal, and then, this exposure light amount signal E is converted into the output image signal O. In the present invention, as represented in FIG. 12, the input image signal I may be directly converted into the output image signal O by employing the image signal converting condition I-O without the intermediate signal. In this alternative case, instead of the target density data E-D which defines the relationship between the exposure light amount signal E and the image density D in the above-described embodiment, such target density data I-D for defining a relationship between the input image signal I and the image density D (shown in FIG. 13) may be employed. Also, the target input image signal values of the test chart $I_k^*$ (k=1 to 6) corresponding to the measurement density values $M_k$ (k=1 to 6) obtained from the test chart image may be calculated by employing the target density data I-D from such data of the reference density values which put therebetween each of the measurement density values $M_k$ (k=1 to 6), for example, both reference density value data $R_{12}$ and reference density value data $R_{13}$, corresponding to the measurement density value $M_3$, and reference density value data $R_7$ and $R_8$ corresponding to the measurement density value $M_4$. Then, while both this target input image signal values $I_k^*$ (k=1 to 6) and the test chart output image signal values $O_k$ (k=1 to 6) are employed, an image signal converting condition I-O may be calculated.

Similar to the above-explained embodiment, a method of calculating the image signal converting condition I-O may be carried out in a similar calculation manner defined in the formula (2) and the formula (3) as follows. That is, based upon the test chart output image signal values $O_k$ (k=1 to 6) corresponding to the measurement density values $M_k$ (k=1 to 6) of the test chart image, the image signal converting condition I-O is regionally subdivided. Then, the conversion parameters for determining a conversion curve of the regionally-divided image signal converting condition I-O are calculated every region such that the relationship between the input image signal I of the test chart image and the image density D can be substantially made coincident with the target density data I-D.

Next, a calibration system of image recording apparatuses according to the present invention will now be explained.

Figure 14:
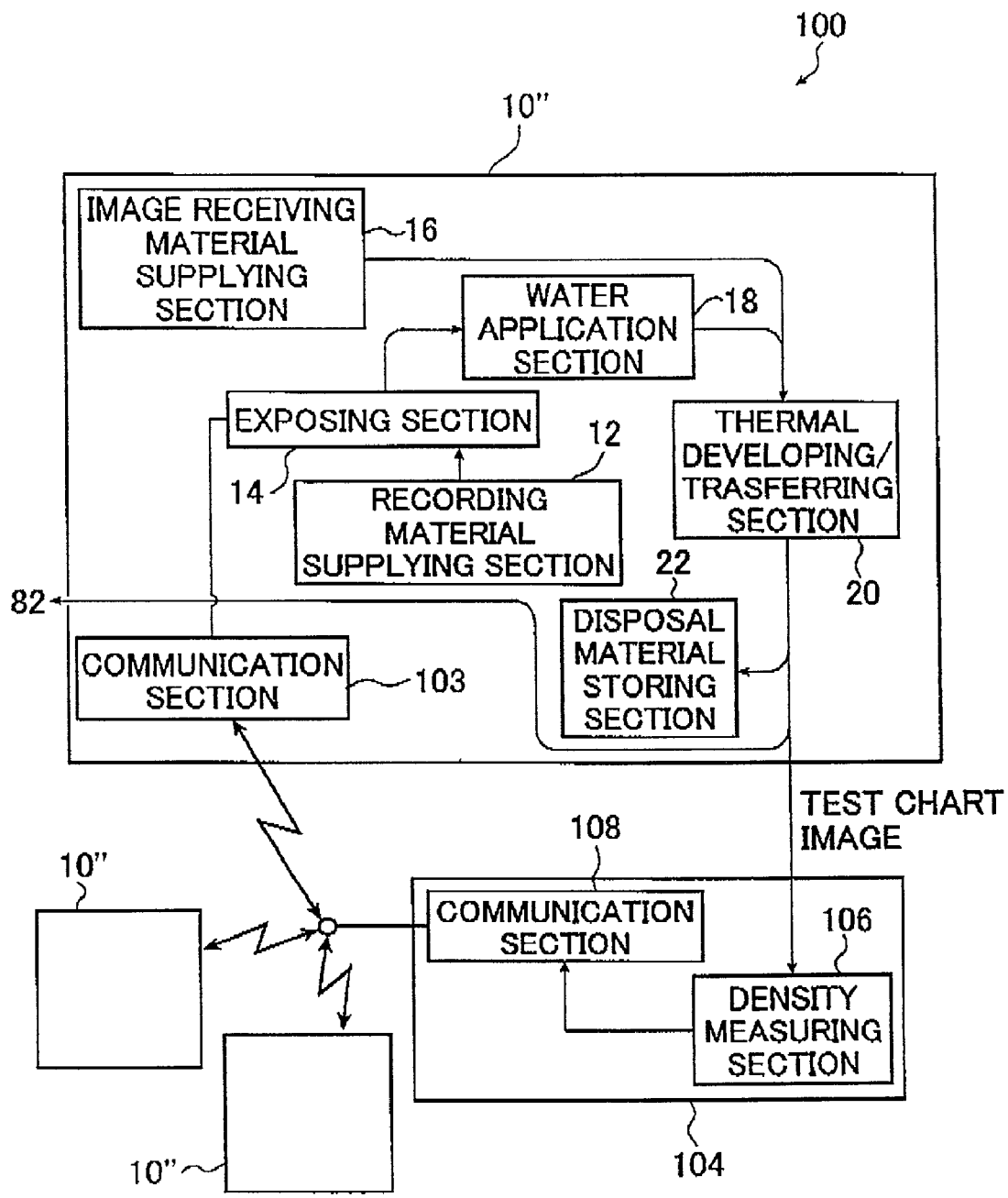
FIG. 14 is a block diagram for representing an example of a calibration system of image recording apparatuses according to the present invention.

FIG. 14 schematically represents an example of the calibration system of the image recording apparatuses according to the present invention. The image recording apparatus calibration system (hereinafter referred to as a present system) 100 indicated in FIG. 14 is arranged by comprising a plurality of recording apparatuses 10", and a density measuring apparatus 104 which is connected via a communication line such as a LAN (local area network) to these recording apparatuses 10". Each of the recording apparatuses 10" may realize an adjustment of an exposure light amount signal converting condition similar to that of the above-described recording apparatus 10 by employing the density measuring apparatus 104 connected via the communication line to the own recording apparatus 10".

Each of the recording apparatuses 10" owns substantially the same arrangement as the recording apparatus 10 in the above-explained embodiment. This recording apparatus 10"

corresponds to such an image recording apparatus capable of converting an input image signal I via an exposure light amount signal E into an output image signal O based upon an exposure light amount signal converting condition T, and capable of exposing a recording material A so as to record a desirable image on this recording material A by way of an optical beam which is modulated in response to this output image signal O. Therefore, in such a case that the structural elements of the recording apparatus 10" are the same as those of the recording apparatus 10, the same reference numerals and symbols as the recording apparatus 10 are applied thereto. In other words, the recording apparatus 10" is provided with a recording material supplying section 12, an exposing section 14, an image receiving material supplying section 16, a water application section 18, a thermal developing/transferring section 20, a disposal material storing section 22, and a communication section 103. The recording material supplying section 12 supplies the recording material A corresponding to a photosensitive material. The image receiving material supplying section 16 supplies an image receiving material R. The recording apparatus 10" does not contain both the density measuring unit 24 and the white reference plate 26, which are owned by the recording apparatus 10.

In this example, since the recording material supplying section 12, the exposing section 14, the image receiving material supplying section 16, the water application section 18, the thermal developing/transferring section 20, and the disposal material storing section 22, all of which have the same reference numerals as those of the above-explained recording apparatus 10 own the same structures as well as the same operations, explanations thereof are omitted.

A test chart image recorded on the recording apparatus 10" is supplied to the density measuring apparatus 104 so as to measure densities of this supplied test chart image.

The communication section 103 corresponds to a device for receiving data related to measurement density values of the test chart image, which is measured by the density measuring apparatus 104. A communication dedicated apparatus known in the technical field is employed as this communication section 103.

On the other hand, the density measuring apparatus 104 contains both a density measuring section 106 and a communication section 108.

The density measuring section 106 measures densities of plural patches of the test chart image supplied from the recording apparatus 10" to obtain measurement density values $M_k$ (k=1 to 6). The density measuring section 106 owns a similar arrangement to that of the density measuring section 24 and of the white reference plate 26 employed in the above-explained recording apparatus 10.

The communication section 108 corresponds to such a unit for transmitting the measurement density values $M_k$ which are measured by the density measuring section 106 to the communication section 103, and such a communication dedicated apparatus known in this technical field is employed as this communication section 108.

In such a present system 100, when the recording apparatus 10" is initiated, after the recording apparatus 10" has been used for printing predetermined times, or upon receipt of a request issued from an operator, a calibration operation of the recording apparatus 10" is carried out. The recording apparatus 10" executes the process operations defined from the step 106 to the step 108 shown in FIG. 8, and thus, the test chart image produced by the recording apparatus 10" is supplied to the density measuring apparatus 104. In the density measuring apparatus 104 to which the test chart image is supplied, the density measurement of this test chart image is carried out by the density measuring section 106. The resulting measurement density values $M_k$ (k=1 to 6) of the test chart image are transmitted via the communication section 108 to the communication section 103.

The measurement density values $M_k$ received by the communication section 103 are supplied to the exposure light amount signal converting condition calculating unit 46 of the exposing section 14, and then, the process operations defined after the step 110 are executed.

As explained above, the process operations defined from the step 104 to the step 126 are repeatedly carried out until the relationship between the test chart exposure light amount signal values and the measurement density values can be substantially made coincident with the target density data E-D. As a result, such an exposure light amount signal converting condition can be calculated to be determined which is finally and substantially made coincident with the target density data E-D.

Thereafter, the image input signal I is supplied to the recording apparatus 10" so as to be converted into the output image signal O, and then this output image signal O is exposed/recorded on the recording material A.

Such a recording apparatus 10" may call test chart output image signal values which are previously stored in the memory unit 44, and then may produce a test chart image based upon this test chart output image signal values. By such an alternative operation, a desirable exposure light amount signal converting condition T may be calculated, while the setting operation of the exposure light amount signal converting condition $T^{(i)}$ executed at the step 104 is not previously carried out, and the process operations defined from the step 104 to the step 126 does not need to be repeated.

In the present system 100, since the recording apparatus 10" does not need employ the density measuring unit, a total number of structural components employed in this recording apparatus 10" is reduced, which may contribute to reductions of the system manufacturing cost. Moreover, since the recording apparatus 10" is automatically calibrated when the apparatus is initiated, the operator continuously does not need to pay his attention to the calibration operation of the recording apparatus 10", so that the workload given to the operator can be reduced.

In addition, since the single density measuring apparatus 104 is commonly used by a plurality of recording apparatuses 10", the measurement density value can be made constant irrespective of the device difference, as compared with such a case that each of the plural recording apparatus 10 owns the density measuring section 24, so that the equal image qualities can be obtained under stable condition among a plurality of image recording apparatuses.

While the image recording apparatus, the image recording method, and the calibration system of image recording apparatuses, according to the present invention, have been described in detail, the present invention is not limited only to the above-described embodiments, and may be modified and changed without departing from the technical scope of the present invention.

As previously explained in detail, conventionally, in such a case that the image signal converting condition such as the exposure light amount signal converting condition is regionally subdivided so as to adjust this subdivided image signal converting condition every region, this image signal converting condition is regionally subdivided while the output image signal values corresponding to the density values of the target density data are employed as standard values. To the contrary, in accordance with the present invention, while the test chart output image signal values corresponding to the measurement density values are employed as standard values, the image signal converting condition is regionally subdivided. As a result, a plurality of measurement density values which are substantially equal to a total number of regional subdivisions may be measured, and thus, a total number of the patches contained in the test chart image can be reduced. Moreover, the exposure light amount signal values of the test chart corresponding to the measurement density values of the test chart image can be predicted/calculated from the target density data having a large number of points, while using a pair of reference density values which put therebetween each of the measurement density values. As a consequence, the calculation precision is neither varied nor depending upon a total number of these measurement density values, and also the calculation of the exposure light amount signal converting condition can be carried out with high precision.

Also, since the patch number of the test chart image can be reduced, the time required for calibrating the image recording apparatus can be shortened, the consumption of the recording materials and the like can decrease, and also the running cost can get cheap.

In addition, since one density measuring apparatus is commonly used by a plurality of image recording apparatuses, the measurement density values can be made constant irrespective of the device difference, as compared with such a case that each of the plural image recording apparatuses owns the density measuring section, so that the equal image qualities can be obtained under stable condition among a plurality of image recording apparatuses.

What is claimed is:

1. An image recording apparatus comprising:
   a recording device for recording an image on a recording medium;
   an image signal converting device for converting signal values of a first image signal of the image into signal values of a second image signal to be used for recording by said recording device by employing an image signal converting condition indicative of a relationship between the first image signal and the second image signal;
   a density measuring device for reading a test chart image recorded by said recording device by using test chart output image signal values of the second image signal, to acquire measurement density values of the test chart image;
   a reference density value selecting device for selecting reference density values corresponding to the measurement density values from a target density data, the target density data indicating a relationship between the first image signal and target density of an image recorded on the recording medium, and having a total data number larger than that of the measurement density values acquired by said density measuring device; and
   a converting condition calculating device for calculating target image signal values of the test chart image based upon the target density data and the reference density values, each of the target image signal values corresponding to each of the measurement density values, and for calculating the image signal converting condition based upon both the target image signal values and the test chart output image signal values, wherein signal values of the first image signal of the image to be recorded are converted into signal values of the second image signal by the image signal converting condition and the image is recorded.

2. The image recording apparatus as claimed in claim 1, wherein:
   said reference density value selecting device selects a pair of reference density values corresponding to each of the measurement density values, the pair putting each of the measurement density values therebetween; and
   said converting condition calculating device calculates each of the target image signal values based upon a linear interpolation manner by employing the pair of the reference density values.

3. The image recording apparatus as claimed in claim 1, wherein the target density data is set in accordance with a sort of the recording medium.

4. The image recording apparatus as claimed in claim 1, wherein said image recording apparatus further comprises converting condition storage device for storing thereinto the image signal converting condition with respect to each of sorts of recording media.

5. The image recording apparatus as claimed in claim 1, wherein:
   after the image signal converting condition is set in said image signal converting device,
   the test chart image is recorded by said recording device based upon predetermined test chart input image signal values which are converted to the test chart output image signal values at a least by the image signal converting condition set in said image signal converting device, and
   respective operations of said image signal converting device, said recording device, said density measuring device, said reference density value selecting device, and said converting condition calculating device are repeatedly carried out by employing the test chart input image signal values, while the image signal converting condition set in said image signal converting device is replaced by the calculated image signal converting condition every time said converting condition calculating device calculates, until the image signal converting condition which makes a relationship between signal values of the first image signal of the test chart image and the measurement density values of the test chart image substantially coincident with the target density data is found out, whereby a relationship between the first image signal and density of an image to be recorded on the recording medium is substantially made coincident with the target density data.

6. The image recording apparatus as claimed in claim 1, wherein:
   the test chart output image signal values are predetermined values; and
   the image signal converting condition which is calculated by said converting condition calculating device by employing the test chart output image signal values is set to said image signal converting device.

7. The image recording apparatus as claimed in claim 1 wherein:
   the test chart image corresponds to such a test chart image in which a plurality of patch images are arranged along one array direction, and densities of the patch images vary in an order of a patch image arrangement; and
   said image recording apparatus further comprises measurement density control device operable in such a manner that when measurement density value of the test chart image does not correspond to the order of the patch image arrangement along the array direction, the measurement density value not corresponding thereto is removed from the measurement density values of the test chart image.

8. The image recording apparatus as claimed in claim 1 wherein the recording medium is a photosensitive material.

9. The image recording apparatus as claimed in claim 1 wherein:
said image recording apparatus further comprises:
judging device for judging as to whether or not the measurement density values of the test chart image satisfy an error condition; and
default setting device for default-setting the image signal converting condition in accordance with a judgement result of said judging device.

10. The image recording apparatus as claimed in claim 9 wherein said image recording apparatus further comprises notifying device for issuing a notification in accordance with the judgement result.

11. The image recording apparatus as claimed in claim 1, wherein:
said reference density value selecting device selects a pair of reference density values corresponding to each of the measurement density values, the pair putting each of the measurement density values therebetween.

12. The image recording apparatus as claimed in claim 1, wherein:
the test chart image is recorded by said recording device based upon predetermined test chart input image signal values which are converted to the test chart output image signal values at least by the image signal converting condition set in said image signal converting device.

13. The image recording apparatus as claimed in claim 1, wherein:
said image recording apparatus further comprises measurement density control device operable in such a manner that when a measurement density value of the test chart image does not correspond to an order of a patch image arrangement, the measurement density value not corresponding thereto is removed from the measurement density values of the test chart image.

14. An image recording method in which signal values of a first image signal are converted into signal values of a second image signal by employing an image signal converting condition indicative of a relationship between the first image signal and the second image signal, and an image is recorded on the recording medium by using signal values of the second image signal, comprising the steps of:
reading a test chart image recorded on the recording medium by using test chart output image signal values of the second image signal, to acquire measurement density value of the test chart image;
selecting reference density values, corresponding to the measurement density values, from a target density data, the target density data indicating a relationship between the first image signal and target density of an image recorded on the recording medium, and having a total data number larger than that of the measurement density values;
calculating target image signal values of the test chart image based upon the target density data and the reference density values, each of the target image signal values corresponding to each of the measurement density values; and
calculating the image signal converting condition based upon both the target image signal values and the test chart output image signal values.

15. The image recording method of claim 14, wherein:
said selecting reference density values selects a pair of reference density values corresponding to each of the measurement density values, the pair putting each of the measurement density values therebetween.

16. The image recording method of claim 14 further comprising:
recording the test chart image based upon predetermined test chart input image signal values which are converted to the test chart output image signal values at least by the set image signal converting condition.

17. The image recording method as claimed in claim 14, further comprising:
when a measurement density value of the test chart image does not correspond to an order of a patch image arrangement, removing the measurement density value not corresponding thereto, from the measurement density values of the test chart image.

18. A calibration system of image recording apparatuses comprising a plurality of image recording apparatuses, and a density measuring apparatus connected via a communication line to said plural image recording apparatuses, wherein each of said image recording apparatus includes:
an image signal converting device for converting signal values of a first image signal into signal values of a second image signal to be used for recording on a recording medium by employing an image signal converting condition indicative of a relationship between the first image signal and the second image signal;
a recording device for recording an image on a recording medium by using signal values of the second image signal into which signal values of the first image signal are converted by said image signal converting device;
a communication device for receiving density measurement values of a test chart image which is recorded by said recording device from test chart output image signal values of the second image signal and supplied to said density measuring apparatus and measured by said density measuring apparatus;
a reference density value selecting device for selecting reference density values corresponding to the measurement density values from a target density data, the target density data indicating a relationship between the first image signal and target density of an image recorded on the recording medium, and having a total data number larger than that of the measurement density values acquired by said density measuring device; and
a converting condition calculating device for calculating target image signal values of the test chart image based upon the target density data and the reference density values, each of the target image signal values corresponding to each of the measurement density values, and for calculating the image signal converting condition based upon both the target image signal values and the test chart output image signal values; and wherein:
said density measuring apparatus includes:
density measuring device for measuring densities of the test chart image supplied from each of image recording apparatuses to acquire measurement density values; and
communication device for transmitting the measurement density values acquired by said density measuring device to said image recording apparatus in which the test chart image is recorded.

* * * * *